US012619315B2

(12) United States Patent
Corson et al.

(10) Patent No.: US 12,619,315 B2
(45) Date of Patent: May 5, 2026

(54) MODULAR UNIT CELL DEVICES CONFIGURED TO BE INTEGRATED IN VARIOUS WEARABLE DEVICES, AND METHODS OF USE THEREOF

(71) Applicant: Meta Platforms Technologies, LLC, Menlo Park, CA (US)

(72) Inventors: Nicholas Roy Corson, Woodinville, WA (US); David Rother Dobbs, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/034,434

(22) Filed: Jan. 22, 2025

(65) Prior Publication Data

US 2025/0165076 A1 May 22, 2025

Related U.S. Application Data

(63) Continuation of application No. 18/494,716, filed on Oct. 25, 2023, now Pat. No. 12,223,113.

(60) Provisional application No. 63/420,477, filed on Oct. 28, 2022.

(51) Int. Cl.
*G06F 3/01* (2006.01)

(52) U.S. Cl.
CPC .............. *G06F 3/016* (2013.01); *G06F 3/014* (2013.01)

(58) Field of Classification Search
CPC .......... G06F 3/016; G06F 3/014; G06F 3/011; G06F 3/017
See application file for complete search history.

(56) References Cited

U.S. PATENT DOCUMENTS

| | | | | |
|---|---|---|---|---|
| 11,011,033 | B1 * | 5/2021 | Piazza ................. | G02B 27/017 |
| 2010/0156818 | A1 * | 6/2010 | Burrough ............ | G06F 3/04883 |
| | | | | 345/173 |
| 2017/0357325 | A1 * | 12/2017 | Yang .................... | G06F 3/0443 |
| 2018/0179051 | A1 * | 6/2018 | Keller ................ | B81C 1/00119 |
| 2019/0187794 | A1 * | 6/2019 | Khoshkava ........... | G06F 1/163 |
| 2021/0005064 | A1 * | 1/2021 | Culbertson ............ | G06F 3/014 |

* cited by examiner

*Primary Examiner* — Patrick N Edouard
*Assistant Examiner* — Joseph P Fox
(74) *Attorney, Agent, or Firm* — Morgan, Lewis & Bockius LLP

(57) ABSTRACT

A wearable device comprises a unit cell that includes, a structural element that has proximal and distal sides, and a first distal haptic-feedback generator of a first kind and a second distal haptic-feedback generator of the first kind that are both connected to the distal side of the structural element. The unit cell includes a proximal haptic-feedback generator that is connected to the proximal side of the structural element. The wearable device includes a processor configured to: cause a first type of haptic feedback by activating the first distal haptic-feedback generator to cant the structural element relative to skin of the user, cause a second type of haptic feedback by activating the first and second distal haptic-feedback generators to displace the structural element, and cause a third type of haptic feedback by activating the proximal haptic-feedback generator.

20 Claims, 20 Drawing Sheets

300

VR device 910

912

914

916

948A-1

939B    939C    939A    939D

939D

916

948A-2    990

918

1062-5

1000

1062-1
1062-2
1062-3
1004

MODULAR UNIT CELL DEVICES CONFIGURED TO BE INTEGRATED IN VARIOUS WEARABLE DEVICES, AND METHODS OF USE THEREOF

RELATED APPLICATIONS

This application is a continuation of U.S. patent application Ser. No. 18/494,716, filed on Oct. 25, 2023, entitled "Modular Unit Cell Devices Configured To Be Integrated In Various Wearable Devices, And Methods Of Use Thereof," which claims the benefit of U.S. Provisional Patent Application Ser. No. 63/420,477, entitled "Modular Unit Cell Devices Configured To Be Integrated In Various Wearable Devices, And Methods Of Use Thereof," filed Oct. 28, 2022, each of which is herein fully incorporated by reference in its respective entirety.

TECHNICAL FIELD

The present disclosure relates generally to devices used for providing feedback (e.g., haptic feedback) to users to emulate objects (e.g., an object's surface, an object's temperature, etc.) viewed with artificial realities (e.g., augmented realities or virtual realities) that are easily adopted into various wearable devices (e.g., gloves or other body-worn components that supply haptic feedback).

BACKGROUND

Typically, devices used for providing feedback to users on wearable devices used in augmented realities are use-specific (e.g., gloves having a specific design) and the components used for this specific use case (e.g., haptic-feedback generators) are not easily adapted to other kinds of wearable devices. Thus, designing multiple wearable devices becomes cost prohibitive and can require repeated ground-up redesigns, even for different iterations of the same device (e.g., different glove designs). As it stands, the current technologies used to make wearable devices are cost-prohibitive for most consumers. Accordingly, there is a need for wearable devices capable of being manufactured at lower costs and having components that can be used across different wearable devices.

SUMMARY

The wearable devices and the components described herein solve the issues with current wearable devices described above. The present disclosure discusses modular unit cells that can be used across multiple wearable device platforms (e.g., having a consistent shape between unit cells) without requiring extensive redesigns. Having a common standard design allows for unit cells to interact with other unit cells of different generations and allows the unit cells to be placed within different wearable devices. For example, a unit cell may include a haptic-feedback generator, and that unit cell can be used to interconnect with other nearby unit cells (e.g., using a common design). Modularity of components allows for mass production while also reducing the need for redesigns of products for each new iteration or type of wearable device (e.g., a glove, a sock, a chest plate, a headset, etc.). As will be discussed in detail below, the wearable and other electronic devices, including the methods of use thereof, described herein address one or more of the aforementioned drawbacks. A first wearable device includes multiple unit cells, where each unit cell includes a haptic-feedback generator. Various embodiments of the first wearable device are described in the clauses below, beginning with clause (A1).

(A1) In some embodiments, an example wearable device includes a first unit cell (e.g., FIG. 5A shows the unit cell 501A at a first position) that includes a haptic-feedback generator. The haptic-feedback generator is of a first type and is located at a first position on the wearable device. The wearable device also includes a second unit cell that includes another haptic-feedback generator (e.g., FIG. 5A shows the unit cell 501B at a second position). The other haptic-feedback generator is of the first type and is located at a second position on the wearable device that is adjacent to the first position (e.g., FIG. 5A shows the unit cells 501A and 501B, including respective haptic-feedback generators 502A and 502B, adjacent to each other). Additionally, the wearable device includes a connection (e.g., adjustable connection 504A in FIGS. 5D and 5E) between the first unit cell and the second unit cell. The connection is adjustable to move the first unit cell away from the first position or the second unit cell away from the second position (e.g., FIG. 5E shows the unit cell 501A moving away from its initial position). Further, the wearable device includes a processor configured to cause a size adjustment to either the haptic-feedback generator or the other haptic-feedback generator (e.g., FIGS. 5A-5C shows that the haptic-feedback generators 502A-502E can be activated). The size-adjustment provides a first type of haptic feedback to a user wearing the wearable device. The processor is also configured to cause a positional adjustment via the connection. The positional adjustment moves the haptic-feedback generator away from the first position to provide a second type of haptic feedback to the user (e.g., FIG. 5E shows the unit cell 501A moving away from its initial position). The second type of haptic feedback is a distinct type of haptic feedback as compared to the first type of haptic feedback.

(A2) In some embodiments of the wearable device of A1, the first unit cell is in communication with the processor and the second unit cell (e.g., FIG. 1C shows a patterned interconnect 120 that allows for adjacent unit cells to couple with each other pneumatically, fluidically, and electronically. In some embodiments, the second unit cell is not in communication with the processor. In some embodiments, the first unit cell is configured to transmit instructions received from the processor to the second unit cell.

(A3) In some embodiments of the wearable device of any of A1-A2, the processor is configured to receive feedback from the first unit cell and the second unit cell in conjunction with causing the size adjustment or the positional adjustment. Additionally, the processor is configured to use the feedback to cause a change in the provision of one or both of the size adjustment and the positional adjustment.

(A4) In some embodiments of the wearable device of any of A1-A3, the wearable device includes a plurality of unit cells that includes the first unit cell and the second unit cell (e.g., FIG. 2 shows a plurality of unit cells 204 placed adjacent to each other and coupled to one another to produce a patterned assembly of unit cells 200 that can be placed into a wearable device). The processor is also configured to, at a first point in time, cause size adjustments to respective haptic-feedback generators of a first subset of the plurality of unit cells. Additionally, the processor is configured to, at a second point in time that is distinct from the first point in time, reverse the size adjustments of the first subset of the plurality of unit cells and cause size adjustments to respective haptic-feedback generators of a second subset of the plurality of unit cells. The second subset of unit cells is positioned adjacent to the first subset of unit cells within the wearable device; such that a combination of the size adjustments at the first and second points in time emulate an object moving over skin of a user (e.g., FIG. 9C is a high-level block diagram illustrating an artificial-reality system 800 that can be in communication with the unit cells described herein).

(A5) In some embodiments of the wearable device of any of A1-A4, the processor is configured to cause a size adjustment to the haptic-feedback generator to provide a tactile haptic feedback while causing a positional adjustment to the haptic-feedback generator via an adjustment in the connection to provide a shear haptic feedback (e.g., FIGS. 5A-5E illustrate haptic feedback that can occur by adjusting the position of the unit cells via the adjustable connections 504A-504H and expanding the haptic-feedback generators 502A-502E).

(A6) In some embodiments of the wearable device of any of A1-A5, the processor is configured to cause another size adjustment to the haptic-feedback generator and the other haptic-feedback generator. The processor is also configured to cause another positional adjustment of one or both of the haptic-feedback generator or the other haptic-feedback generator via another change in the connection, such that a third type of haptic feedback is provided via the wearable device to the user. The third type of haptic feedback is distinct from the first and second types of haptic feedback.

(A7) In some embodiments of the wearable device of any of A1-A6, the processor is configured to provide a third type of haptic feedback to the user. The third type of haptic feedback is distinct from the first type of haptic feedback and the second type of haptic feedback. Additionally, providing the third type of haptic feedback includes causing another size adjustment to either the haptic-feedback generator or the other haptic-feedback generator (e.g., FIGS. 5B, 5C, and 5E illustrate three different kinds of haptic feedback).

(A8) In some embodiments of the wearable device of any of A1-A7, the processor is configured to provide a fourth type of haptic feedback to the user. The fourth type of haptic feedback is distinct from the first type of haptic feedback and the second type of haptic feedback. Also, providing the fourth type of haptic feedback includes causing another positional adjustment of the haptic-feedback generator or the other haptic-feedback generator via another change in the connection.

(A9) In some embodiments of the wearable device of any of A1-A8, the haptic-feedback generator and the other haptic-feedback generator each include a respective pneumatic cell, a hydraulic cell, an electroactive polymer (EAP) cell, or a dielectric elastomer actuator (DEA) cell (e.g., FIG. 1A-1C illustrates hydraulic or pneumatic haptic-feedback generators).

(A10) In some embodiments of the wearable device of any of A1-A9, the first unit cell and the second unit cell each have a matching shape that, when combined, produces a tessellation on a surface of the wearable device (e.g., FIG. 2 shows a plurality of unit cells 204 placed adjacent to each other and coupled to one another to produce a patterned assembly of unit cells 200).

(A11) In some embodiments of the wearable device of any of A1-A10, the wearable device also includes a first plurality of unit cells that includes the first unit cell. The first plurality of unit cells has a first density, and the first unit cell has a shape and a first size. Additionally, the wearable device includes a second plurality of unit cells that includes the second unit cell. The second plurality of unit cells has a second density that is different from the first unit cell density, and the second unit cell has the shape and a second size that is a geometric scaling of the first size. For example, FIG. 5F illustrates pluralities of unit cells 524A-524C, with each plurality having unit cells of different sizes (e.g., unit cell 522 is larger than unit cell 501A) and spaced according to different densities (e.g., plurality 524A is denser than plurality 524C).

(A12) In some embodiments of the wearable device of any of A1-A11, the wearable device includes a plurality of unit cells including the first unit cell and the second unit cell. The wearable device also includes a plurality of connections including the connection (e.g., FIGS. 5D and 5E illustrate adjustable connections 504A-504H). Additionally, the processor is configured to cause the plurality of connections to expand while donning or doffing the wearable device.

(A13) In some embodiments of the wearable device of any of A11-A12, the processor is further configured to cause the plurality of connections to contract while the wearable device is donned on a hand of a user (e.g., FIGS. 5F, 5G, and 6G illustrate a wearable glove device that includes the unit cells described herein).

(A14) In some embodiments of the wearable device of any of A1-A13, the first unit cell and the second unit cell each have a heating or cooling element to heat or cool skin of a user.

(A15) In some embodiments of the wearable device of any one of A1-A14, the wearable device is in communication with an artificial reality headset. Also, the first type of haptic feedback and the second type of haptic feedback correspond to interactions within an artificial reality displayed via the artificial reality headset (e.g., FIG. 9C is a high-level block diagram illustrating an artificial-reality system 800 that can be in communication with the unit cells described herein).

(A16) In some embodiments of the wearable device of any of A1-A15, the change in connection causing the positional adjustment occurs in response to a linear actuator being enabled by the processor (e.g., FIGS. 5D and 5E illustrate adjustable connections 504A-504H, which are linear actuators or driven by linear actuators).

(A17) In some embodiments of the wearable device of any of A1-A16, the haptic-feedback generator and the other haptic-feedback generator each include a respective pneumatic cell configured to expand when filled with air. Additionally, the wearable device includes a glove and a pump. The pump is located on a dorsum portion of the glove. The pump is also configured to fill with air the respective pneumatic cells of the haptic-feedback generator and the other haptic-feedback generator. Further, the pump is part of a closed-loop pneumatic system. For example, FIGS. 7A-7C illustrate multiple embodiments for routing fluid or air to respective haptic-feedback generators or respective unit cells.

(B1) In another aspect, a method of providing haptic feedback occurs at a wearable device, including (i) a first unit cell that includes a haptic-feedback generator, wherein the haptic-feedback generator is of a first type and is located at a first position on the wearable device, (ii) a second unit cell that includes another haptic-feedback generator, wherein the other haptic-feedback generator is of the first type and is located at a second position on the wearable device that is adjacent to the first position, and (iii) a connection between the first unit cell and the second unit cell, the connection being adjustable to move the first unit cell away from the first position or the second unit cell away from the second position. The method includes causing a size adjustment to either the haptic-feedback generator of the first unit cell or the other haptic-feedback generator to provide a first type of haptic feedback to a user wearing the wearable device. The method further includes causing a positional adjustment, via the connection, to move the haptic-feedback generator away from the first position to provide a second type of haptic feedback to the user, the second type of haptic feedback being a distinct type of haptic feedback as compared to the first type of haptic feedback.

(C1) In yet another aspect, a system comprises an artificial reality device that is in communication with a wearable device. The wearable device includes (i) a first unit cell that includes a haptic-feedback generator, wherein the haptic-feedback generator is of a first type and is located at a first position on the wearable device, (ii) a second unit cell that includes another haptic-feedback generator, wherein the other haptic-feedback generator is of the first type and is located at a second position on the wearable device that is adjacent to the first position, and (iii) a connection between the first unit cell and the second unit cell, the connection being adjustable to move the first unit cell away from the first position or the second unit cell away from the second position. The system is configured to cause a size adjustment to either a haptic-feedback generator of a first unit cell or the other haptic-feedback generator to provide a first type of haptic feedback to a user wearing the wearable device, wherein the size adjustment corresponds to an artificial reality displayed at the artificial reality device. The system is also configured to cause a positional adjustment, via the connection, to move the haptic-feedback generator away from the first position to provide a second type of haptic feedback to the user, the second type of haptic feedback being a distinct type of haptic feedback as compared to the first type of haptic feedback, wherein the positional adjustment corresponds to an artificial reality displayed at the artificial reality device.

(D1) In a further aspect, a non-transitory, computer-readable storage medium includes instructions that, when executed by a wearable device that includes (i) a first unit cell that includes a haptic-feedback generator, wherein the haptic-feedback generator is of a first type and is located at a first position on the wearable device, (ii) a second unit cell that includes another haptic-feedback generator, wherein the other haptic-feedback generator is of the first type and is located at a second position on the wearable device that is adjacent to the first position, and (iii) a connection between the first unit cell and the second unit cell, the connection being adjustable to move the first unit cell away from the first position or the second unit cell away from the second position, cause the electronic device to cause a size adjustment to either a haptic-feedback generator of a first unit cell or the other haptic-feedback generator to provide a first type of haptic feedback to a user wearing the wearable device, wherein the size adjustment corresponds to an artificial reality displayed at the artificial reality device. The instructions also cause a positional adjustment, via the connection, to move the haptic-feedback generator away from the first position to provide a second type of haptic feedback to the user, the second type of haptic feedback being a distinct type of haptic feedback as compared to the first type of haptic feedback, wherein the positional adjustment corresponds to an artificial reality displayed at the artificial reality device.

A second wearable device includes another type of unit cell. The other type of unit cell includes a structural element (e.g., a planar element) positioned within close proximity of the skin of a user, such that displacing or canting the structural element provides, respectively, tactile or shear feedback to the user. For example, the structural element may be connected to two haptic-feedback generators. Activating (e.g., expanding, contracting) one of the haptic-feedback generators causes the structural element to cant (e.g., tilt). Activating both of the haptic-feedback generators causes the structural element to displace.

A second wearable device includes multiple unit cells, where each unit cell includes a at least three haptic-feedback generators, as well as a structural element. Various embodiments of the second wearable device are described in the clauses below, beginning with clause (E1).

(E1) In some embodiments, a wearable device for providing haptic feedback to a user wearing the wearable device includes a unit cell (e.g., unit cell 600 in FIGS. 6A-6G). The unit cell includes a structural element (e.g., structural element 602 in FIGS. 6A-6G) that has a proximal side and a distal side (e.g., proximal side 604 and a distal side 606). The unit cell also includes a first distal haptic-feedback generator of a first kind and a second distal haptic-feedback generator of the first kind that are both connected to the distal side of the structural element (e.g., haptic-feedback generators 608A-608C in FIGS. 6A-6E). Additionally, the unit cell includes a proximal haptic-feedback generator (e.g., haptic-feedback generator 610 in FIGS. 6A-6E) that is connected to the proximal side of the structural element. Further, the wearable device includes a processor configured to cause a first type of haptic feedback by activating the first distal haptic-feedback generator to cant the structural element relative to skin of the user (e.g., FIGS. 6B-6E show three different types of haptic feedback occurring based on which haptic-feedback generators are activated). The processor is also configured to cause a second type of haptic feedback by activating the first and second distal haptic-feedback generators to displace the structural element. Additionally, the processor is configured to cause a third type of haptic feedback by activating the proximal haptic-feedback generator (e.g., haptic-feedback generator 610 is shown as being activated and providing a haptic feedback in FIG. 6E).

(E2) In some embodiments of the wearable device of E1, the processor is configured to cause two of the first type of haptic feedback, the second type of haptic feedback, and the third type of haptic feedback to be provided during a same time. For example, as discussed in reference to FIG. 6E, activating the haptic-feedback generator 610 can occur in concert with the activating one or more of the haptic-feedback generators 608A-608C.

(E3) In some embodiments of the wearable device of any of E1-E2, the unit cell includes a third distal haptic-feedback generator of the first kind (e.g., three haptic-feedback generators 608A-608C in FIGS. 6A-6E). The third distal haptic-feedback generator is connected to the distal side of the structural element. Additionally, causing the first type of haptic feedback includes foregoing activating the third distal haptic-feedback generator. Further, causing the second type of haptic feedback includes activating the third distal haptic-feedback generator. Moreover, the processor is configured to cause a fourth type of haptic feedback, distinct from the first, second, and third types of haptic feedback, by activating the first and third distal haptic-feedback generators to cant the structural element.

(E4) In some embodiments of the wearable device of any of E1-E3, the unit cell is of a first construction. Additionally, the wearable device includes another unit cell of the first construction. Further, the processor is configured to cause a fifth type of haptic feedback via the unit cell and the other unit cell.

(E5) In some embodiments of the wearable device of E4, the unit cell is in direct communication with the processor and the other unit cell. Additionally, the other unit cell is not in direct communication with the processor. Further, the unit cell is configured to transmit instructions received from the processor to the other unit cell.

(E6) In some embodiments of the wearable device of any of E1-E5, the unit cell includes a thermal-feedback generator (e.g., FIGS. 6A-6E illustrate thermal-feedback generator 614) that is connected to the proximal side of the structural element.

(E7) In some embodiments of the wearable device of E6, the processor is configured to cause thermal feedback while causing one of the first type of haptic feedback, the second type of haptic feedback, or the third type of haptic feedback.

(E8) In some embodiments of the wearable device of any of E6-E7, the processer is configured to cause the thermal feedback by increasing the temperature of the thermal-feedback generator.

(E9) In some embodiments of the wearable device of any of E6-E8, the processor is configured to cause the thermal feedback by decreasing the temperature of the thermal-feedback generator.

(E10) In some embodiments of the wearable device of any of E1-E9, the wearable device comprises kinesthetic impedance actuators that restrict freedom of movement of a body part of the user.

(E11) In some embodiments of the wearable device of any of E1-E10, the structural element of the unit cell includes a protrusion that extends from the proximal side of the structural element in a direction away from the distal side of the structural element. Additionally, the proximal haptic-feedback generator is attached to the protrusion such that it is located at a farthest point from the distal side of the structural element.

(E12) In some embodiments of the wearable device of E11, the unit cell includes a third distal haptic-feedback generator of the first kind that is connected to the distal side of the structural element. Additionally, the structural element is triangular and planar. The structural element also includes three vertices. Further, each of the first distal haptic-feedback generator, the second distal haptic-feedback generator, and the third distal haptic-feedback generator is connected to a respective vertex of the three vertices of the structural element (e.g., the structural element 602 in FIGS. 6A-6G has three vertices, with haptic-feedback generators 608A-608C at the three vertices).

(E13) In some embodiments of the wearable device of any of E1-E12, the wearable device further includes an electroactive polymer (EAP) sensor. The EAP sensor is configured to sense stress applied to the EAP sensor and to communicate data regarding the stress applied to the EAP sensor to the processor. Further, the processor is configured to cause a modification of the first type of haptic feedback, the second type of haptic feedback, or the third type of haptic feedback based on the stress data.

(E14) In some embodiments of the wearable device of any of E1-E13, each of the first and second distal haptic-feedback generators and the proximal haptic-feedback generator includes a respective fluid bladder that is configured to expand when filled with a fluid (e.g., haptic-feedback generators 608A-608C and haptic-feedback generator 610 in FIGS. 6A-6E are fluidic actuators).

(E15) In some embodiments of the wearable device of E14, the wearable device includes a glove (e.g., FIG. 6G shows a wearable device 612 (e.g., a glove) that includes multiple unit cells). The wearable device also includes a pump that is located on a dorsum portion of the glove and is configured to fill the respective fluid bladders of the first distal haptic-feedback generator, the second distal haptic-feedback generator, and the proximal haptic-feedback generator.

(E16) In some embodiments of the wearable device of any of E1-E15, each of the first and second distal haptic-feedback generators and the proximal haptic-feedback generator includes a respective dielectric elastomer actuator (DEA) that is configured to contract when an electric signal is applied to the respective DEA.

(E17) In some embodiments of the wearable device of any of E1-E16, the wearable device includes a high-friction material that is placed between the proximal haptic-feedback generator and skin of the user such that when the processor causes the first type of haptic feedback, the skin of the user is stretched.

(E18) In some embodiments of the wearable device of any of E1-E17, the wearable device is in communication with an artificial reality headset. Also, the first, second, and third types of haptic feedback correspond to an artificial reality displayed at the artificial reality headset (e.g., FIG. 9C is a high-level block diagram illustrating an artificial-reality system 800 that can be in communication with the unit cells described herein).

(F1) In accordance with some embodiments, a non-transitory computer-readable storage medium including instructions that, when executed by an electronic device that includes a unit cell that includes: (i) a structural element that has a proximal side and a distal side, (ii) a first distal haptic-feedback generator of a first kind and a second distal haptic-feedback generator of the first kind that are both connected to the distal side of the structural element, and a proximal haptic-feedback generator that is connected to the proximal side of the structural element, cause the electronic device to cause a first type of haptic feedback by activating the first distal haptic-feedback generator to cant the structural element relative to skin of the user. The instructions, when executed by the electronic device, also cause a second type of haptic feedback by activating the first and second distal haptic-feedback generators to displace the structural element, and cause a third type of haptic feedback by activating the proximal haptic-feedback generator.

(G1) In accordance with some embodiments, a method of providing haptic feedback to a user wearing the wearable device occurs at a unit cell that includes: (i) a structural element that has a proximal side and a distal side, (ii) a first distal haptic-feedback generator of a first kind and a second distal haptic-feedback generator of the first kind that are both connected to the distal side of the structural element, and a proximal haptic-feedback generator that is connected to the proximal side of the structural element. The method includes causing, via a processor, a first type of haptic feedback by activating the first distal haptic-feedback generator to cant the structural element relative to skin of the user. The method also includes causing, via the processor, a second type of haptic feedback by activating the first and second distal haptic-feedback generators to displace the structural element. Additionally, the method includes causing, via the processor, a third type of haptic feedback by activating the proximal haptic-feedback generator.

Additional examples are explained in further detail below.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in the art will appreciate upon reading this disclosure.

FIGS. 8A, 8B-1, and 8B-2 illustrate example AR systems, in accordance with some embodiments.

FIGS. 9A, 9B-1, 9B-2, and 9C show example head-wearable devices, in accordance with some embodiments.

In accordance with common practice, like reference numerals denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by these features and aspects specifically related to the claims. Furthermore, well-known processes, components, and materials have not necessarily been described in exhaustive detail so as to avoid obscuring pertinent aspects of the embodiments described herein.

Figure 1A:
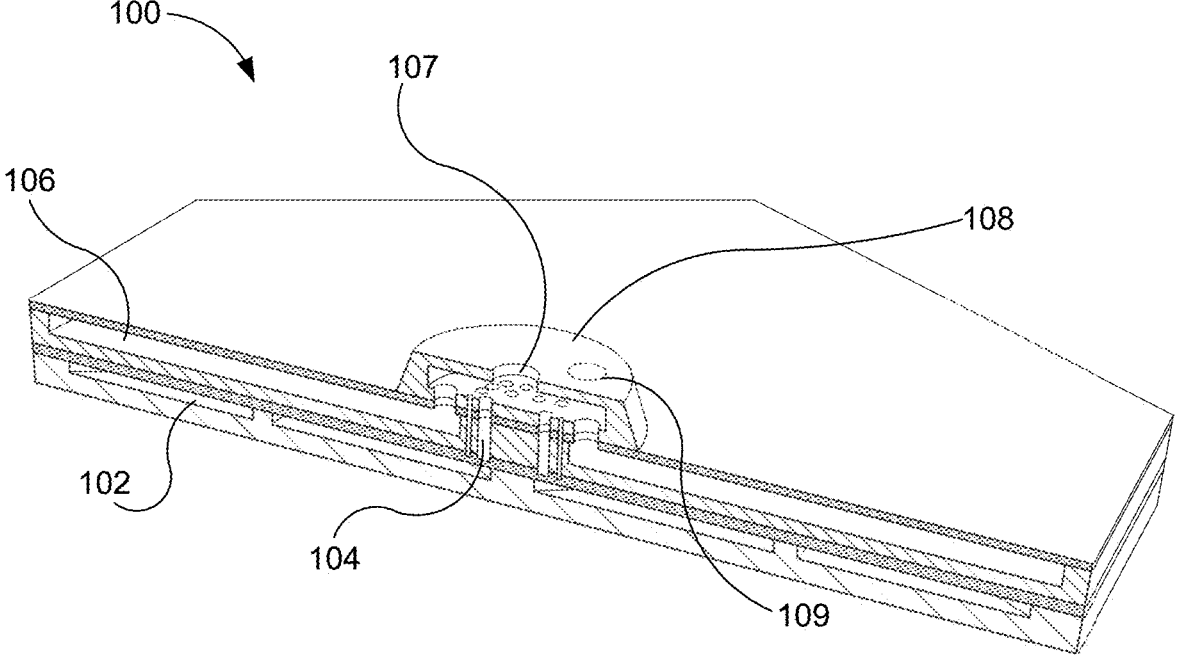
FIGS. 1A-1C illustrate a modular hexagonal unit cell that can be configured to connect to other adjacent unit cells, in accordance with some embodiments.
Figures 1B, 1C:
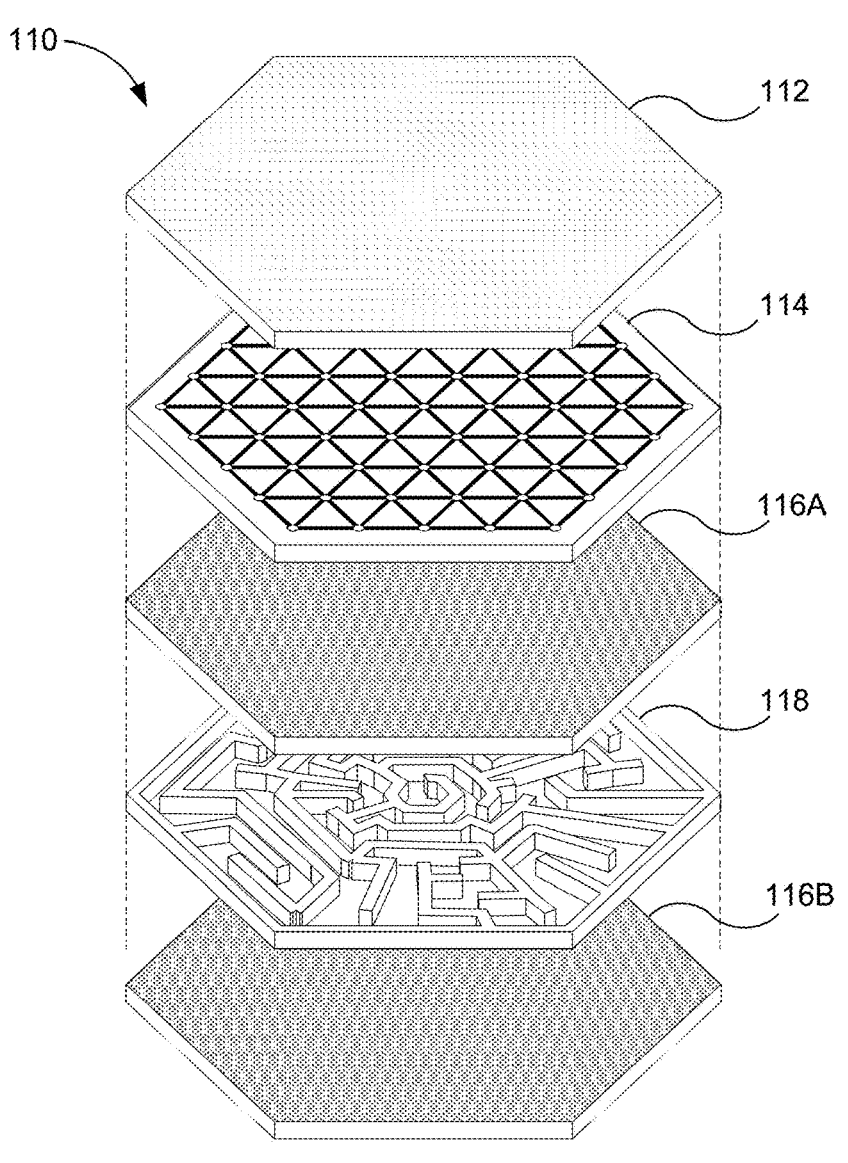

FIGS. 1A-1C illustrate a modular, hexagonal unit cell of a first type that can be configured to connect with other adjacent unit cells, in accordance with some embodiments. FIG. 1A shows a perspective, cross-sectional view of a unit cell of a first type 100. Generally, the unit cell of the first type 100 includes a user interface layer, a haptic transducer layer, an actuator layer, and a routing layer (e.g., an electrical routing layer, a fluidic routing layer). In this particular example, the unit cell of the first type 100 includes: (i) small elements 102, (ii) passages to bladders 104, (iii) medium-sized haptic-feedback generators 106, (iv) a fluid or air pressure inlet 107, (v) a fluidic logic decode unit 108, and (vi) a location for electrical or pneumatic control input 109. In a non-cross-sectional view, the unit cell of the first type 100 has a hexagonal shape that allows for other unit cells having the hexagonal shape to be connected to it, as will be discussed in reference to FIG. 2.

In some embodiments, the user interface layer is in close contact with a user. For example, the user interface layer may be in contact with a user's skin. As another example, the user interface layer may be only separated from the user's skin by fabric (e.g., of the wearable device, of the user's clothing). As yet another example, the user interface layer may be flexible (e.g., fabric) such that haptic feedback from another layer (e.g., the actuator layer) of the unit cell of the first type 100 can easily transfer through the user interface layer to the user.

In some embodiments, the haptic transducer layer includes one or more haptic-feedback generators to provide a haptic feedback to a user. In some embodiments, the actuator layer is configured to contract or expand. For example, the actuator layer may include a bladder that expands when filled with a fluid (e.g., air, a liquid). As another example, the actuator layer may include a dielectric elastomer actuator (DEA) that deforms (e.g., expands along an axis) when an electrical signal is applied to it.

In some embodiments, the routing layer includes routing for the fluid or electricity that flows to the actuator layer. For example, the routing layer can include wiring that connects the actuator layer to wiring external to the unit cell of the first type 100. As another example, the routing layer can include channels that direct the fluid to the actuator layer.

The illustrated unit cell of the first type 100 also includes an inlet 107 and passages 104. In some embodiments, the inlet 107 is a fluid inlet that allows a fluid (e.g., air, a liquid) to enter the unit cell of the first type 100. In some embodiments, the inlet 107 is an electrical inlet that allows wiring to connect to or pass into the unit cell of the first type 100. After a fluid or electrical signal enters the unit cell of the first type 100, the passages 104 can direct the fluid or electrical signal into the actuator layer, thereby causing the actuator layer to expand, contract, or deform. Similarly, the passages 104 can also direct the fluid or the electrical signal out of the actuator layer, causing the actuator layer to contract, expand, or deform.

The illustrated unit cell of the first type 100 also includes electronics (e.g., a circuit board, a processor, a microcontroller). For example, the electronics can receive a signal requesting that the unit cell of the first type 100 activate. Accordingly, the haptic-feedback generator can cause fluid or an electrical signal to flow to the actuator layer, thereby activating the unit cell of the first type 100.

FIG. 1B illustrates an exploded view of another variation of a hexagonal unit cell 110, in accordance with some embodiments. The illustrated other unit cell 110 further illustrates a user interface layer 112, a haptic transducer layer 114, two sensing layers 116A and 116B, and an electrical/fluidic routing layer 118. In some embodiments, the user interface layer 112 is at a furthest end (e.g., closest to skin of a user) of the other unit cell 110. For example, the user interface layer 112 may include the fabric of a wearable device (e.g., a glove). In some embodiments, the haptic transducer layer 114 is right next to the user interface layer 112. In some embodiments, the actuator layer 116 is right next to the haptic transducer layer 114. For example, the close proximity between the user interface layer 112 and the actuator layer 116 can allow the actuator layer 116 to transfer a haptic-feedback via the user interface layer 112 to a user. In some embodiments, the routing layer is right next to the actuator layer 116, on another furthest end of the other unit cell 110. While a specific layered order is shown in this exploded view, it is possible to order these layers differently.

FIG. 1C illustrates a side, cross-sectional view of the other variation of the hexagonal unit cell 110, in accordance with some embodiments. The illustrated other unit cell 110 includes the user interface layer 112, the haptic transducer layer 114, the actuator layer 116, and the electrical/fluidic routing layer 118. The illustrated other unit cell 110 also includes a patterned interconnect 120. The patterned interconnect 120 allows for adjacent unit cells to couple with the unit cell 110 both pneumatically/fluidically and electronically. The interconnect, as will be described later, can be used to physically couple the unit cells together, electrically/communicatively couple the unit cells together, or hydraulic/pneumatically connect the unit cells together.

Figure 2:
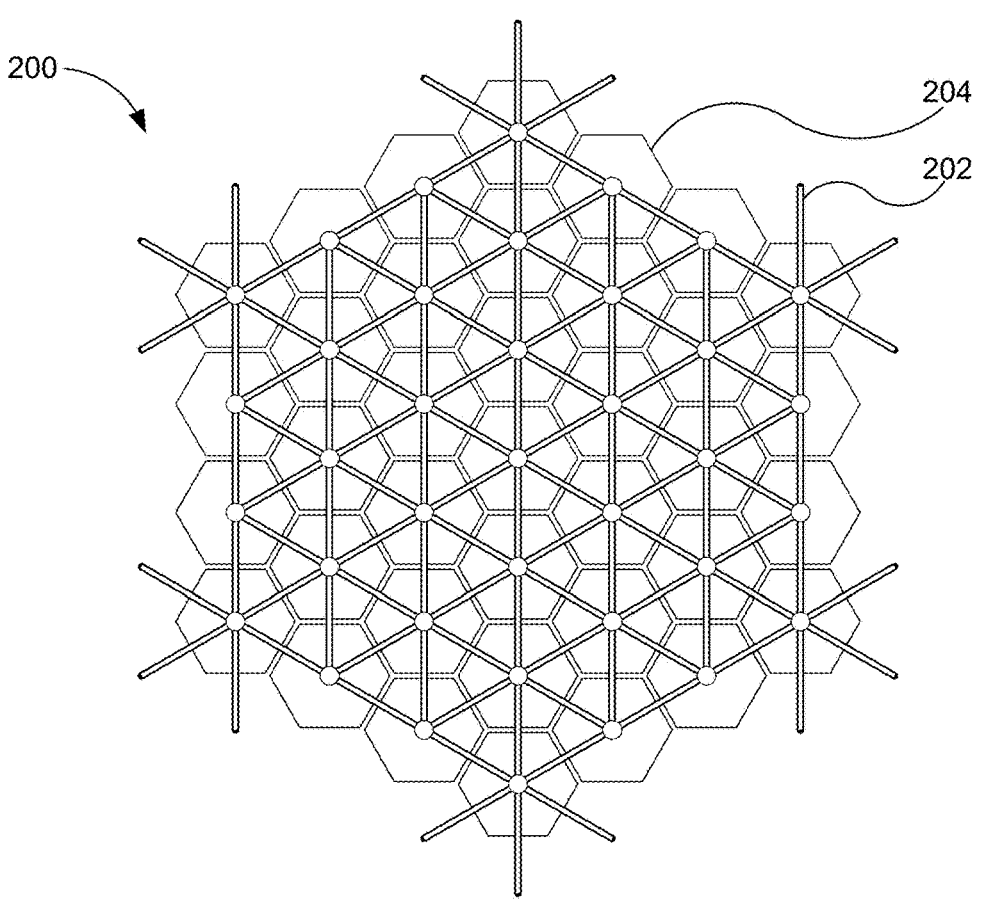
FIG. 2 illustrates a plurality of interconnected hexagonal unit cells that illustrate the modularity of the unit cells, in accordance with some embodiments.

FIG. 2 illustrates a plurality of interconnected hexagonal unit cells that illustrate the modularity of the unit cells, in accordance with some embodiments. FIG. 2 shows a plurality of unit cells 204 placed adjacent to each other and coupled to one another to produce a patterned assembly of unit cells 200. FIG. 2 also shows that the plurality of unit cells 204 are interconnected via pipework lattice 202 for transmitting hydraulic/pneumatic pressure or electrical signals.

Figure 3A:
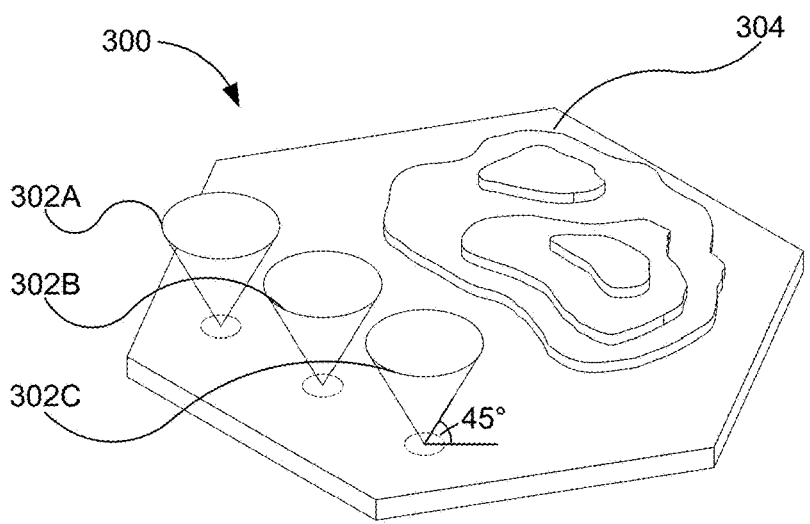
FIGS. 3A and 3B illustrate the types of feedback that can be provided by an assembly of unit cells where each unit cell has a hexagonal design, in accordance with some embodiments.
Figure 3B:
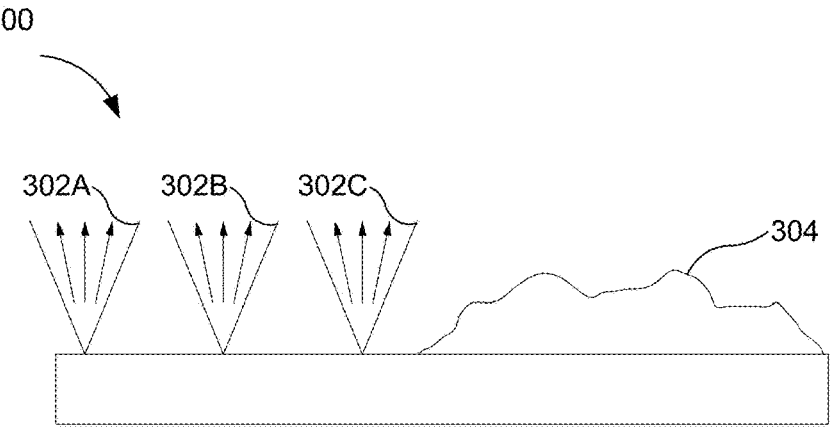

FIGS. 3A and 3B illustrate the types of feedback that can be provided by an assembly of unit cells (e.g., where each unit cell has a hexagonal design), in accordance with some embodiments. FIG. 3A shows an example tensor field 300 associated with the assembly of unit cells, in accordance with some embodiments. The tensor field 300 illustrates haptic and sensing information capable of being provided to and received by the skin of a user. The tensor field 300 illustrates a conical tensor field (e.g., conical tensor cones 302A-302C), and in some embodiments the cone is 45 degrees, as shown in FIG. 3A. In addition, the tensor field 300 also illustrates a topology tensor field 304. The tensor field 300 is thus able illustrate that the unit cells comprising the assembly of unit cells 200 are capable of acting in concert to provide complex feedback resulting from multiple unit cells being activated together (e.g., to differing degrees), or activated individually to produce individual feedback.

FIG. 3B shows another view of the tensor field 300, and further illustrates conical tensor cones 302A-302C, and the topology tensor field 304.

Figure 4:
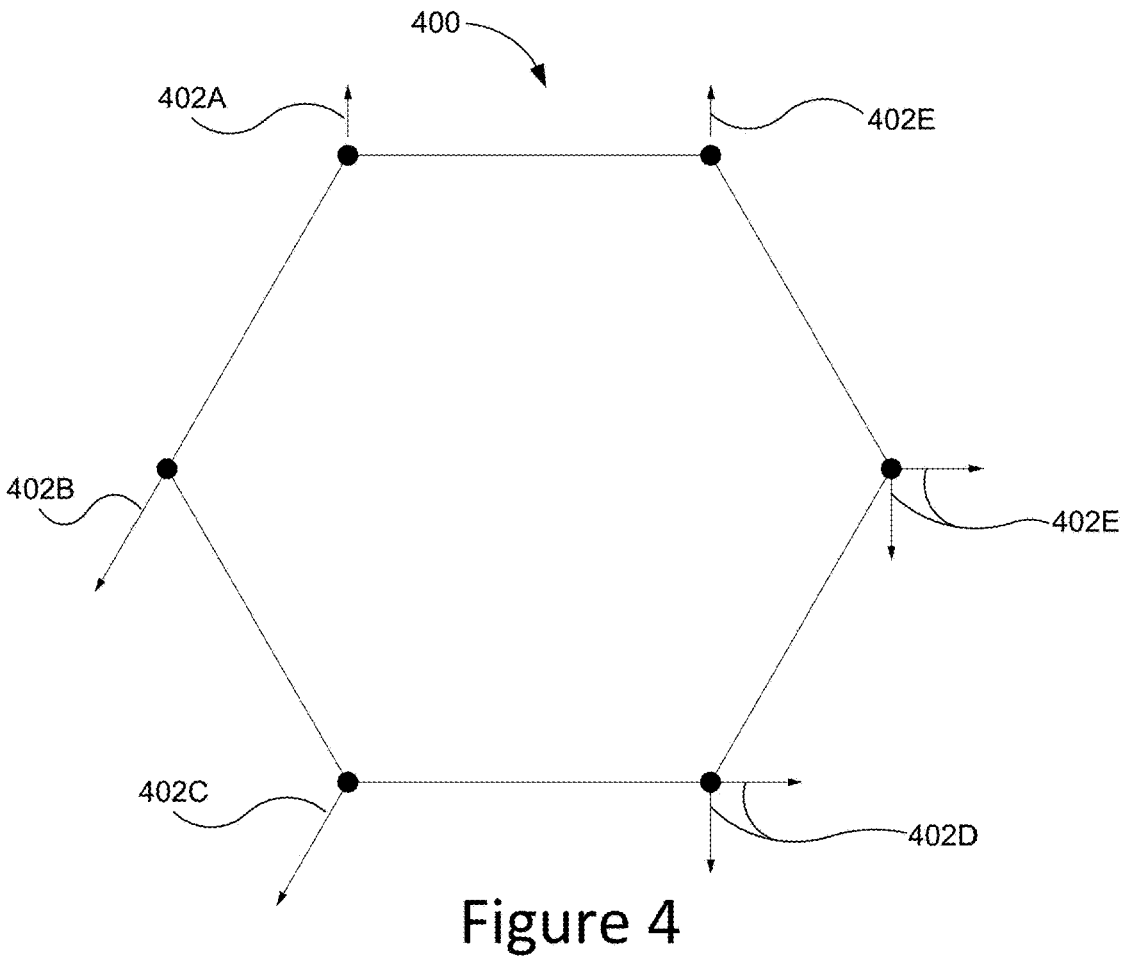
FIG. 4 illustrates stretching modalities in response to applied forces on a hexagonal unit cell, in accordance with some embodiments.

FIG. 4 illustrates stretching modalities in response to applied forces on a hexagonal haptic unit cell, in accordance with some embodiments. In wearable devices, movement is inevitable, so it is necessary for the unit cells to function despite being stretched in multiple directions. FIG. 4 illustrates a force map 400 (e.g., a force map of a unit cell of the first type 100, of the other unit cell 110, or of a patterned assembly of unit cells 200) with forces applied to it. The force map 400 illustrates that the unit cell of the first type 100, the other unit cell 110, or the patterned assembly of unit cells 200 is configured to operate nominally even if a force (e.g., force 402A) is applied to an area (e.g., at a point, on a surface, or along a side) or multiple forces 402A-402F are applied in different directions on the same plane (e.g., forces in opposite directions). While not illustrated, the unit cell of the first type 100, the other unit cell 110, and the patterned assembly of unit cells 200 are also configured to operate nominally when forces are applies in different planes (e.g., torsional forces, bending force, a force in an x-direction, and/or another force in a y-direction). The unit cell of the first type 100, the other unit cell 110, and the patterned assembly of unit cells 200 are configured to stretch to 1.3 to 1.5 times their original size when under load and still operate nominally.

Figures 5A, 5B, 5C:
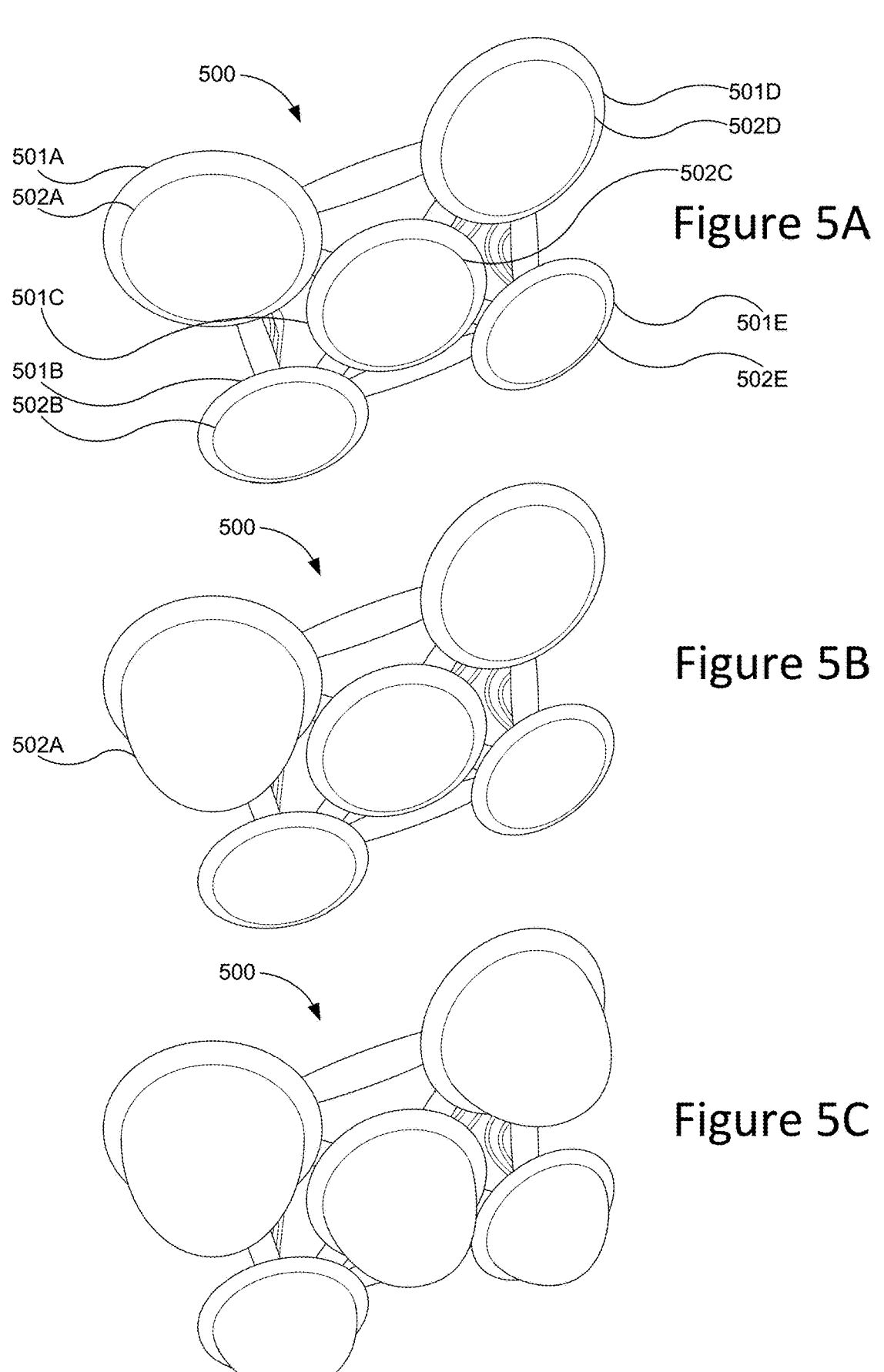
FIG. 5A-5C illustrate a skin contact side of a unit cell of a first type, in accordance with some embodiments.

FIGS. 5A-5C illustrate a skin contact side of a second unit cell type, in accordance with some embodiments. FIG. 5A-5C illustrate an assembly of second type of unit cells 500 that are configured to provide both downward force (e.g., a normal force) and shear force to skin of a user (e.g., stretching skin of a user (e.g., to emulate gravity acting on an object)). FIG. 5A shows the assembly of the second type of unit cells 500 having five different unit cells 501A-501E including respective haptic-feedback generators 502A-502E. FIG. 5A shows these haptic-feedback generators currently in a non-activated state, however, each one of these haptic-feedback generators can be individually activated (e.g., expanded), as is illustrated in FIG. 5C.

FIG. 5B shows that haptic-feedback generator 502A is activated and is configured to apply downward pressure to the skin of a user (e.g., a subset of the haptic-feedback generators are activated). In some embodiments, multiple haptic-feedback generators are independently activated (e.g., two haptic-feedback generators are activated), while not activating others (e.g., three haptic-feedback generators are not activated. Further, in some embodiments, one haptic-feedback generator may be activated to a greater degree than another activated haptic feedback generator. FIG. 5C shows an alternative activation of multiple haptic-feedback generators being activated: Haptic-feedback generators 502A-502E are each activated.

Figure 5D:
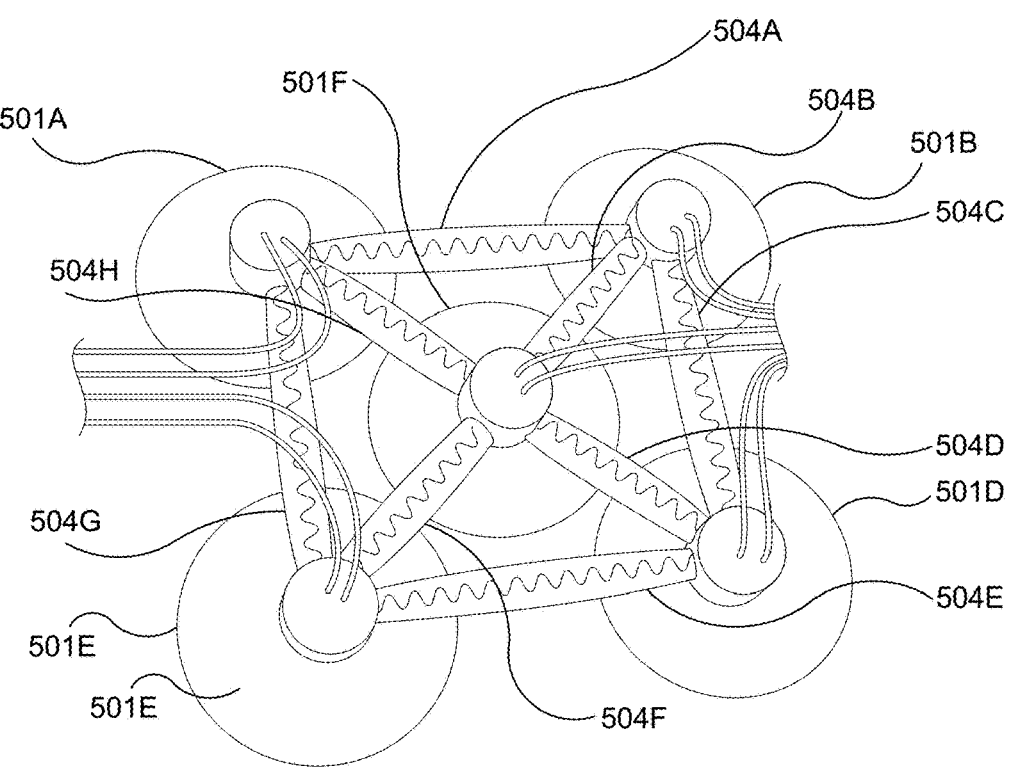
FIGS. 5D-5E illustrate a backside of the unit cell of the first type, in accordance with some embodiments.
Figure 5E:
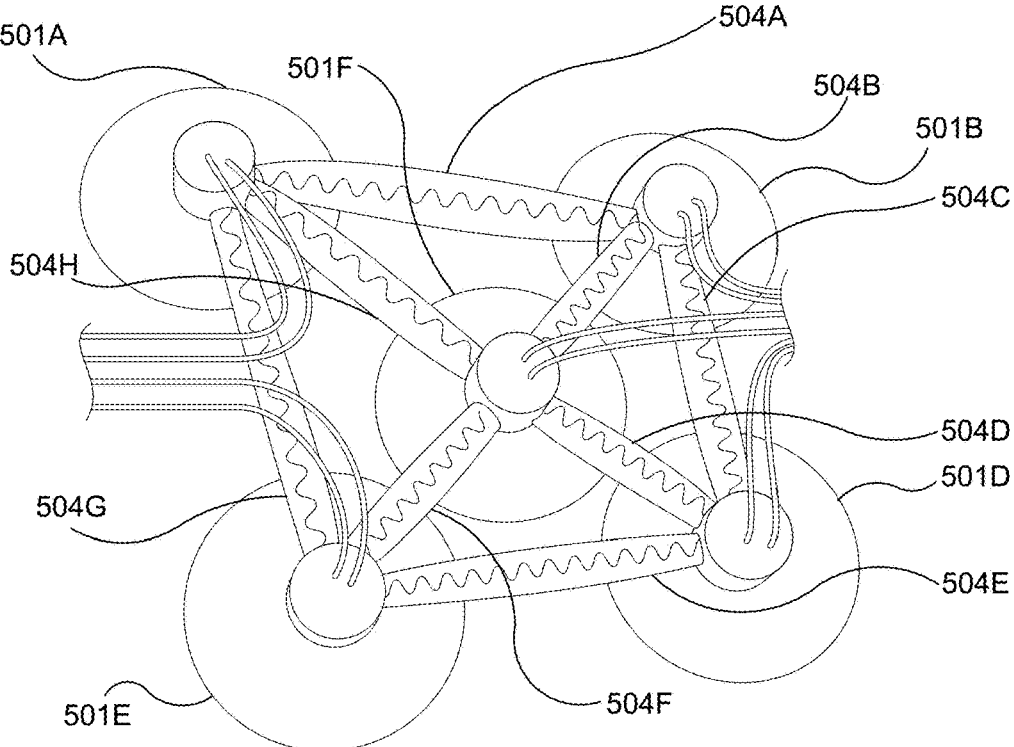

FIGS. 5D-5E illustrate a backside of an assembly of the second type of unit cells, in accordance with some embodiments. In particular, FIG. 5D illustrates the backside of an assembly of second type of unit cells 500, where the assembly 500 includes a plurality of adjustable connections 504A-504H between the each of the second type of unit cells 501A-501E. The adjustable connections 504A-504H are individually activatable and are configured to move the second type of unit cells 501A-501E and consequently the haptic-feedback generators 502A-502E (not pictured) of the second type of unit cells 501A-501E. In some embodiments, movement of the adjustable connections 504A-504H can cause a shear force to be applied to skin of a user (e.g., via haptic-feedback generators 502A-502E).

FIG. 5E shows a subset of the adjustable connections 504A-504H being activated, where activation can include expansion (e.g., to 110%, 132%, etc.) or contraction (e.g., to 50%, 75%, etc.) of any of the adjustable connections 504A-504H. In response to activating a subset of the adjustable connections 504A-504H, a shear force is applied to a user via the second type of unit cells 501A-501E.

Figure 5F:
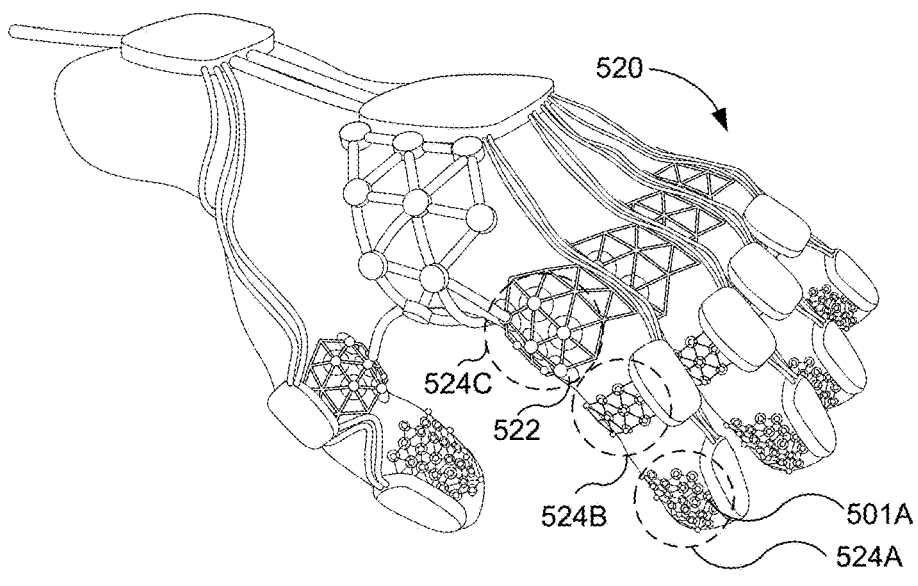
FIGS. 5F and 5G illustrate a wearable glove device that includes a plurality of interconnected unit cells of the second type, in accordance with some embodiments.
Figure 5G:
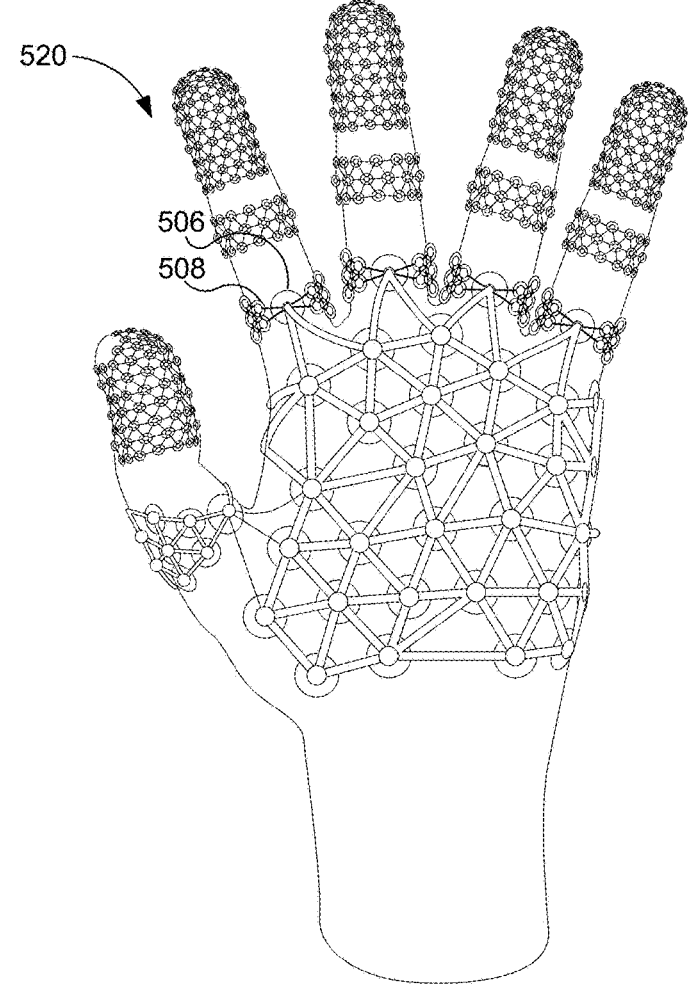

FIGS. 5F and 5G illustrate a wearable glove device that includes a plurality of interconnected unit cells of the second type, in accordance with some embodiments. In particular, FIG. 5F illustrates a wearable glove device 520 that includes the plurality of the second type of unit cells 501A-501E. The wearable glove device 520 includes the second type of unit cells 501A-501E at different scales (e.g., scaled sizes (e.g., large unit cell 522)), which can be beneficial for manufacturing purposes. For example, sub-plurality 524A includes unit cells of a size smaller than that of the unit cells in sub-pluralities 524B and 524C. In some embodiments, the second type of unit cells at a first scale are still coupled with the second type of unit cells at a second scale, where the second scale is smaller than the first scale.

Furthermore, since different parts of the hand of a user have differing concentrations of nerve endings, some parts of the hand only need a certain amount of haptic-feedback generators (e.g., low-resolution feedback, high-resolution feedback) to covey a convincing feedback. For example, the dorsal side of the hand may have less nerve endings than the fingertips. Accordingly, sub-plurality 524A includes a denser concentration of unit cells than sub-pluralities 524B and 524C.

FIG. 5G shows a palmar side of the wearable glove device 520, and further illustrates that the second type of unit cells at the first scale 506 and the second scale 508 are included in specific areas (e.g., fingertips, palm, etc.) to either accommodate concentrations of nerve endings or to avoid obstructing movement of a hand of a user (e.g., by not placing unit cells along finger creases).

Figure 6A:
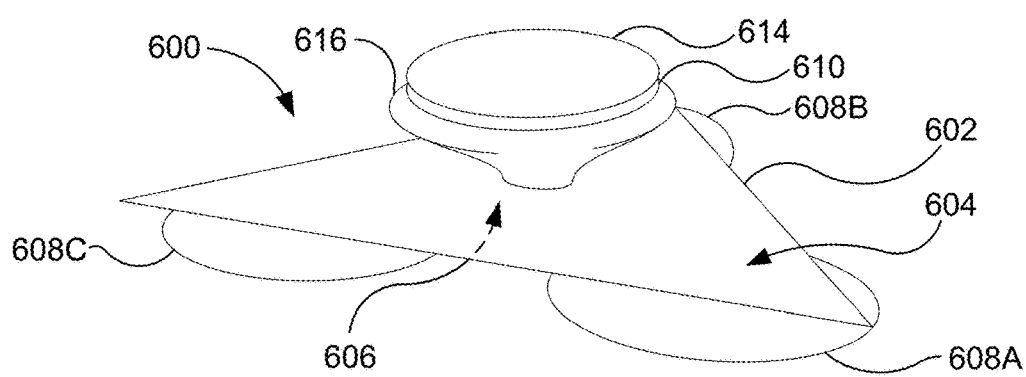
FIGS. 6A-6E illustrate a unit cell of a second type and how it provides feedback to a user, in accordance with some embodiments.

FIGS. 6A-6E illustrate a unit cell of a third type and how it provides feedback to a user, in accordance with some embodiments. In particular, FIG. 6A shows a haptic unit cell 600 that includes a structural element 602 with a proximal side 604 and a distal side 606 that includes a protrusion 616. The distal side 606 is connected to haptic-feedback generators 608A-608C, and the proximal side 604 is connected to haptic-feedback generator 610 (e.g., via protrusion 616). Each of the haptic-feedback generators 608A-608C and the haptic-feedback generator 610 can be activated independently or concurrently to provide multiple types of haptic feedback. In some embodiments, the haptic-feedback generators 608A-608C are not in contact with the user, but are instead used to pivot the haptic-feedback generator 610. Additionally, the unit cell 600 includes a thermal-feedback generator 614. In some embodiments, the thermal-feedback generator is configured to provide thermal feedback (e.g., heat, cold) to a user (e.g., to simulate the temperature of a virtual object).

Figure 6B:
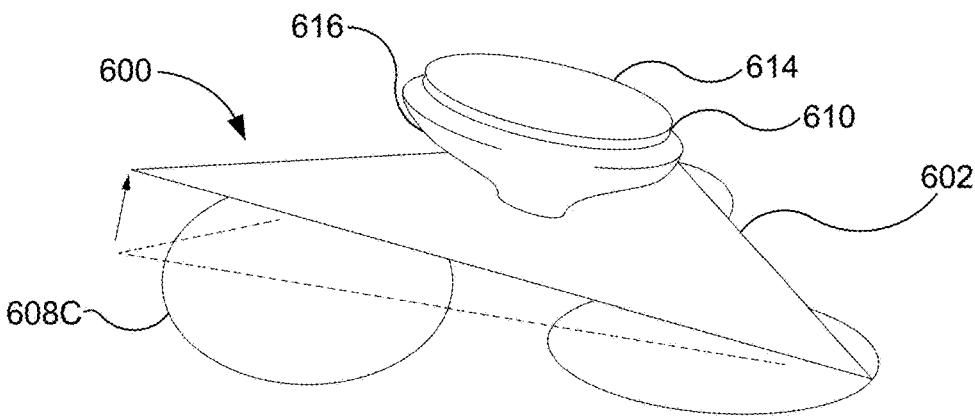
Figure 6C:
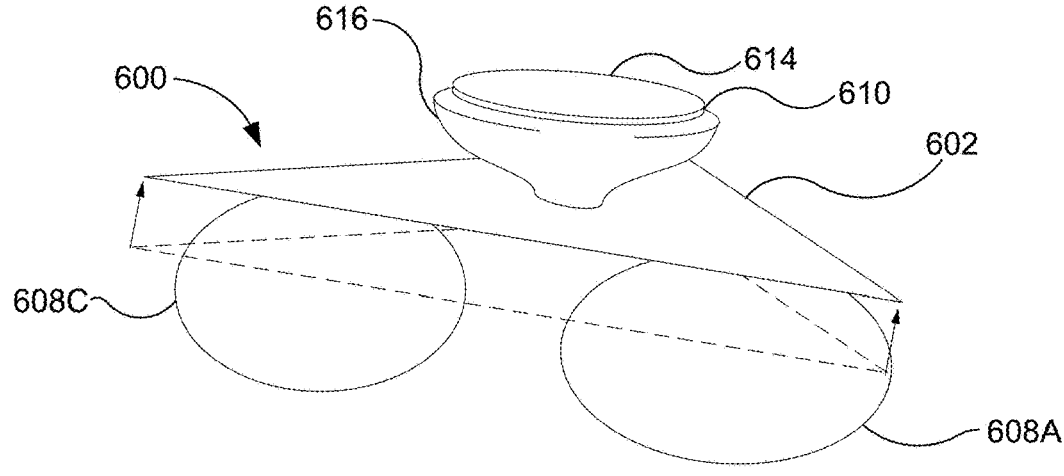
Figure 6D:
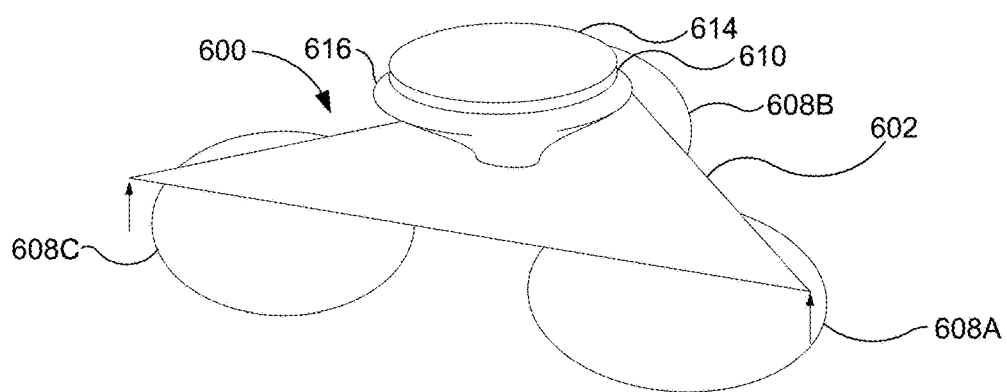

FIG. 6B illustrates activation of the haptic-feedback generator 608A (e.g., expanding to a ballooned state), causing the structural element 602 to pivot and the haptic-feedback generator 610 to pivot. FIG. 6C illustrates activation of haptic-feedback generators 608A and 608B, which causes the structural element 602 to pivot in a different orientation, which thereby pivots the haptic-feedback generator 610 in the different orientation. FIG. 6D illustrates that haptic-feedback generators 608A-608C each being activated that causes the structural element 602 to pivot in yet another orientation (e.g., straight up), which thereby pivots the haptic-feedback generator 610 in the other orientation (e.g., perpendicularly towards the skin of the user).

Figure 6E:
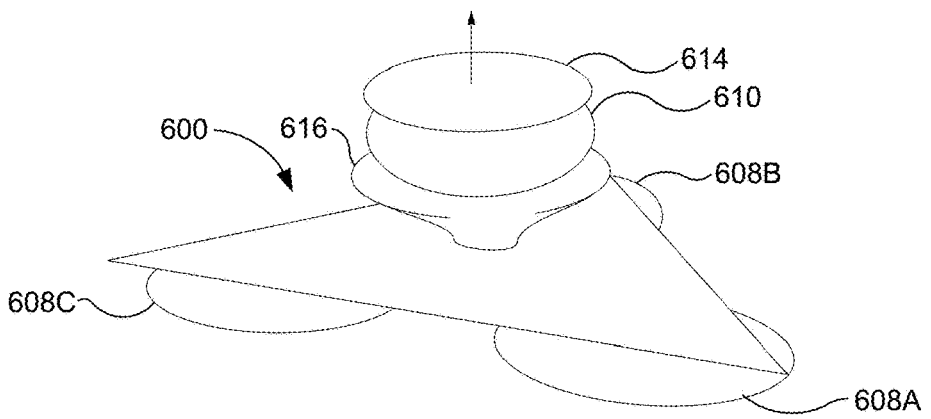

FIG. 6E illustrates activation of the haptic-feedback generator 610 to provide yet another type of haptic feedback. In some embodiments, activation of the haptic-feedback generator 610 occurs in concert with the activation of one or more of the haptic-feedback generators 608A-608C.

Figure 6F:
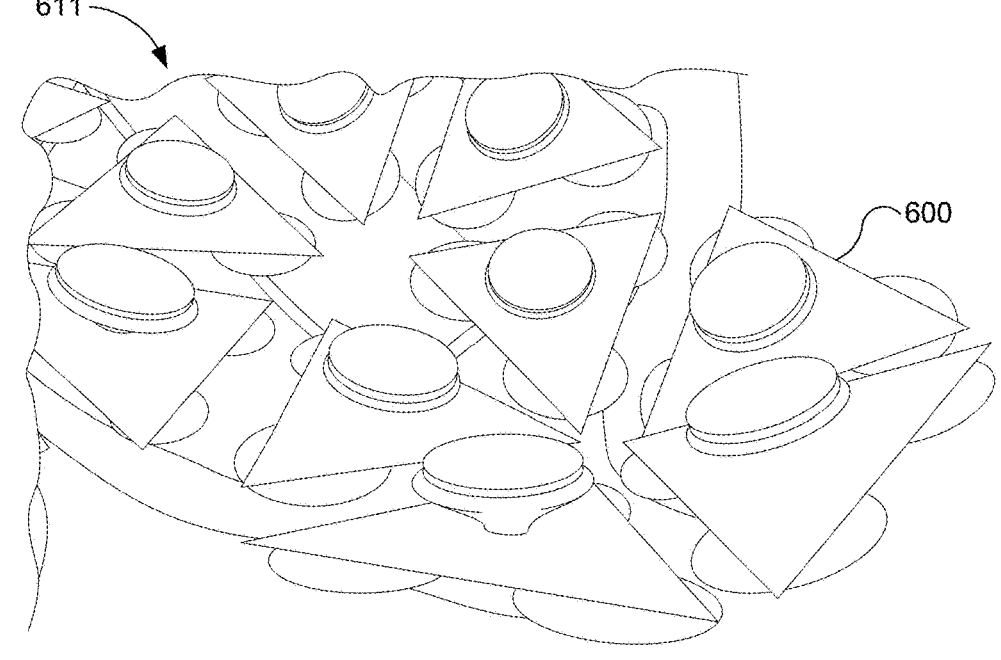
FIGS. 6F and 6G show a plurality of unit cells of the second type interconnected with each other and how the interconnected unit cells can be placed within a wearable device, in accordance with some embodiments.
Figure 6G:
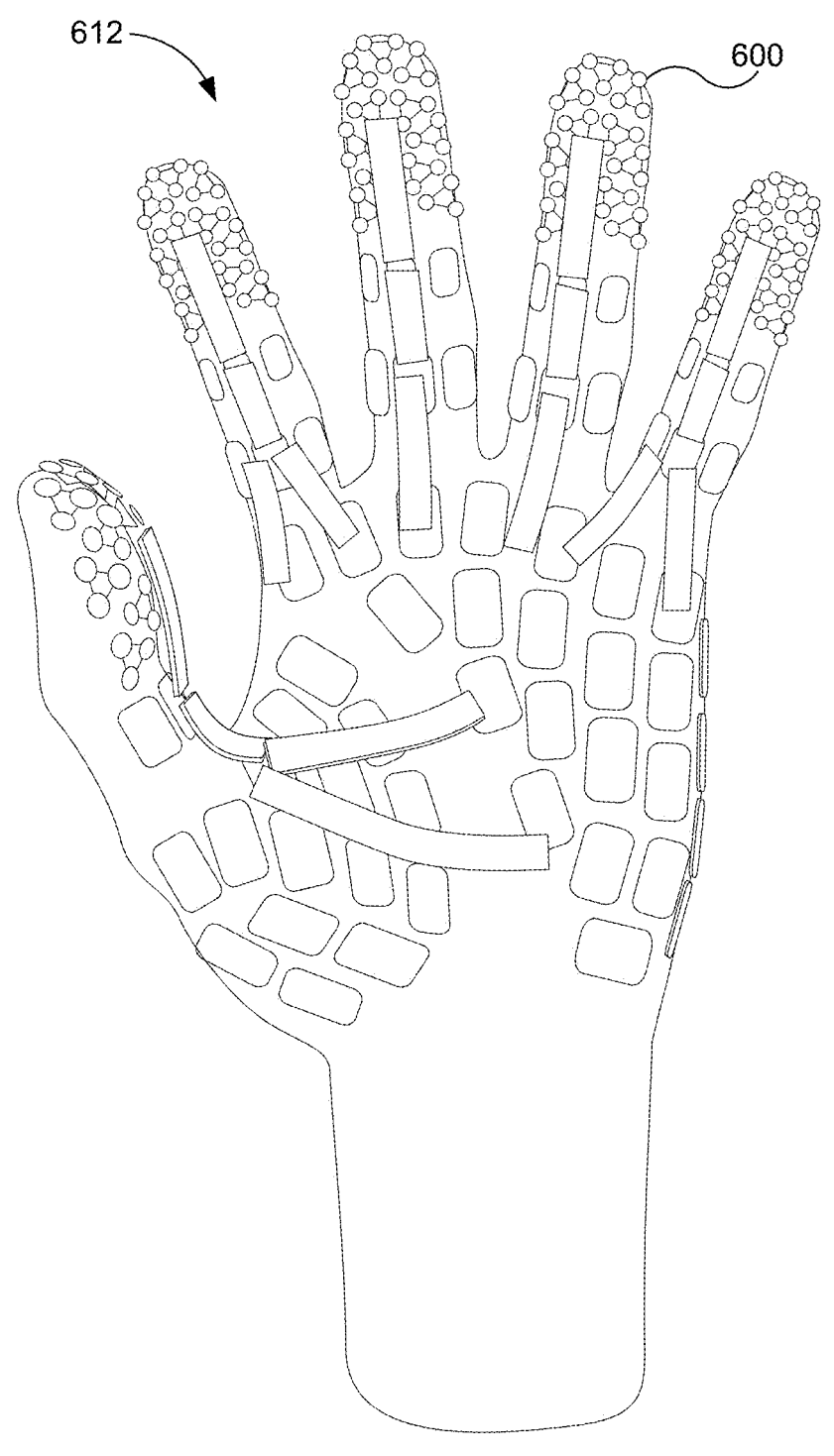

FIGS. 6F and 6G show a plurality of unit cells of the third type interconnected with each other, as well as how the interconnected unit cells can be placed within a wearable device, in accordance with some embodiments. In particular, FIG. 6F shows a close-up view of multiple unit cells (incl. unit cell 600) integrated together to form an assembly of unit cells 611. In some embodiments, the unit cells are connected to each other to produce more complex haptic feedback. FIG. 6G shows a wearable device 612 that includes multiple unit cells (e.g., multiple unit cells 600). As discussed earlier, the unit cells are placed at essential areas (e.g., high nerve ending areas or non-bending areas), and omitted in non-essential areas (e.g., joints or low nerve ending areas). This has the added benefit of reducing weight, which may decrease cost and/or increase user comfort.

Figures 7A, 7B:
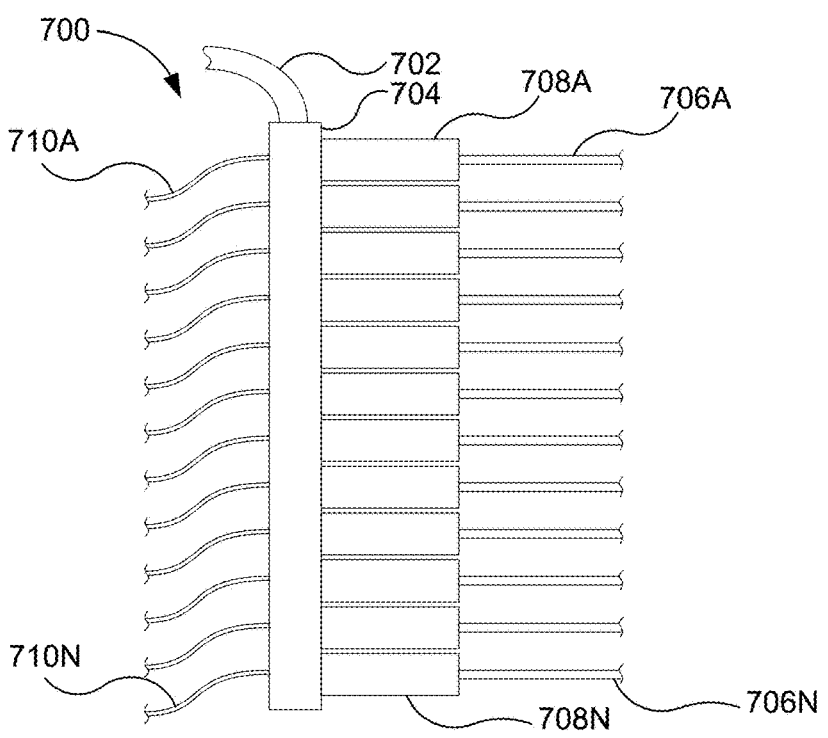
FIGS. 7A-7C illustrate microfluidic channels than can be used in conjunction with the unit cells describes herein, in accordance with some embodiments.
Figure 7C:
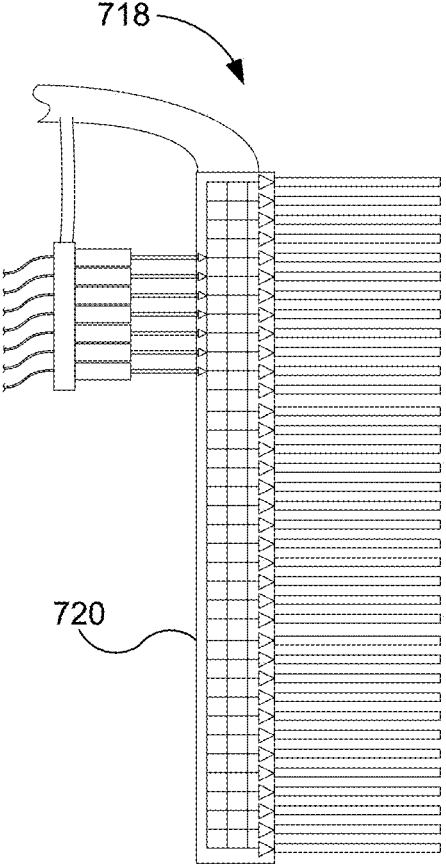

FIGS. 7A-7C illustrate microfluidic channels than can be used in conjunction with the unit cells described herein, in accordance with some embodiments. FIG. 7A illustrates a direct-drive fluidic control topology 700 that does not include any fluidic logic. In particular, FIG. 7A shows a fluid source 702 that is supplied to a manifold 704. For each of the fluid control lines 706A-706N, there are corresponding electromechanical valves 708A-708N that are controlled by respective electrical control signals 710A-710N that are supplied to the electromechanical valves 708A-708N (e.g., by an electrical wire). These fluid control lines 706A-706N are coupled with actuators that are used to supply haptic feedback to a user.

FIG. 7B illustrates another digital fluidic control topology 712, which is similar to the direct-drive fluidic control topology 700, but includes microvalves with exponential horns for further controlling the fluid flow. As shown in FIG. 7B the fluid control lines 714A-714N are coupled with exponential horns 716A-716N. These exponential horns 716A-716N consist of three horns each getting exponentially larger in the direction of the fluid flow. FIG. 7C illustrates yet another digital fluidic control topology 718, which is similar to the direct-drive fluidic control topology 700, but it includes fluidic decode circuits 720.

Example AR Systems

Figure 8A:
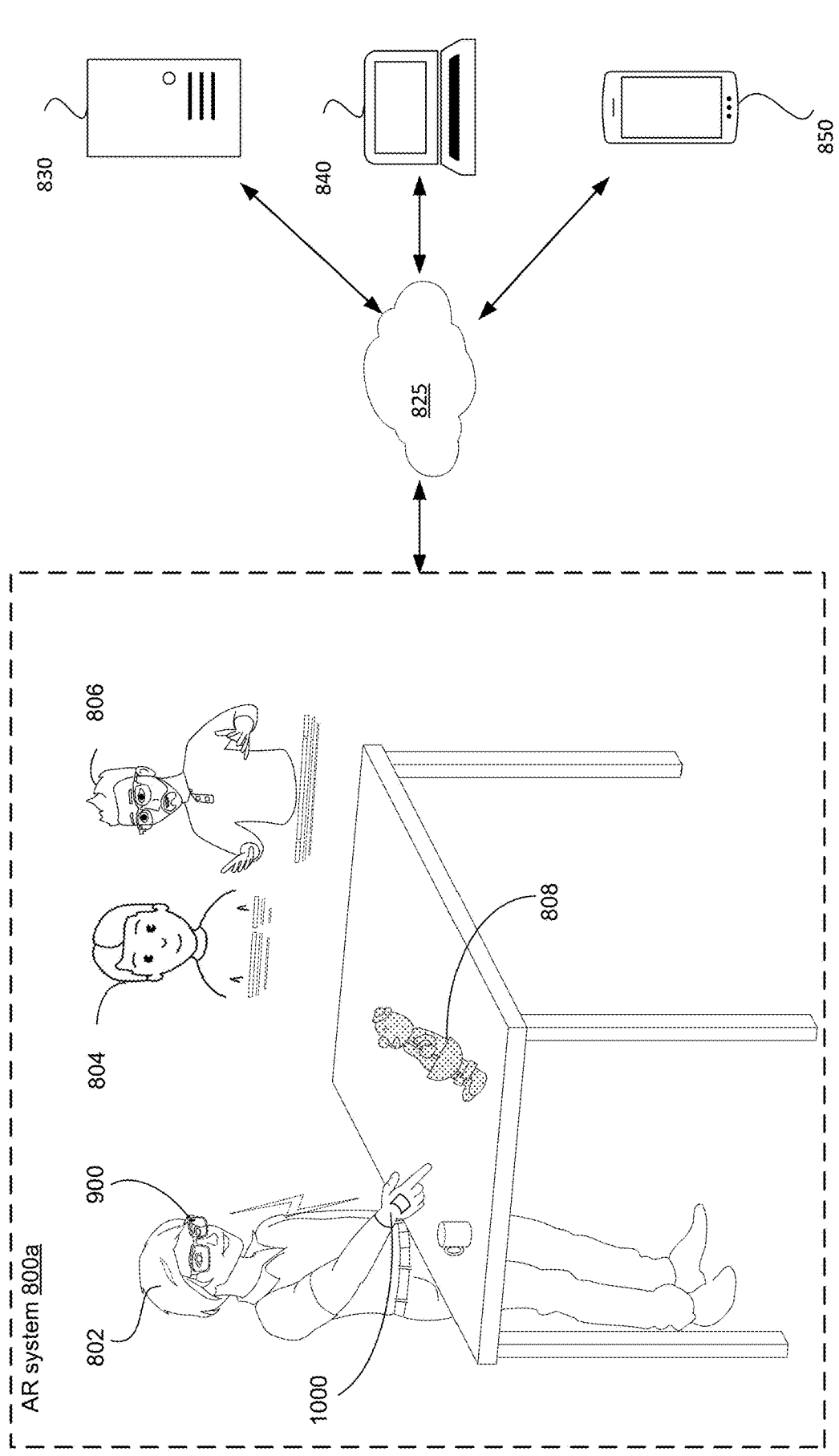
Figures 1, 8B:
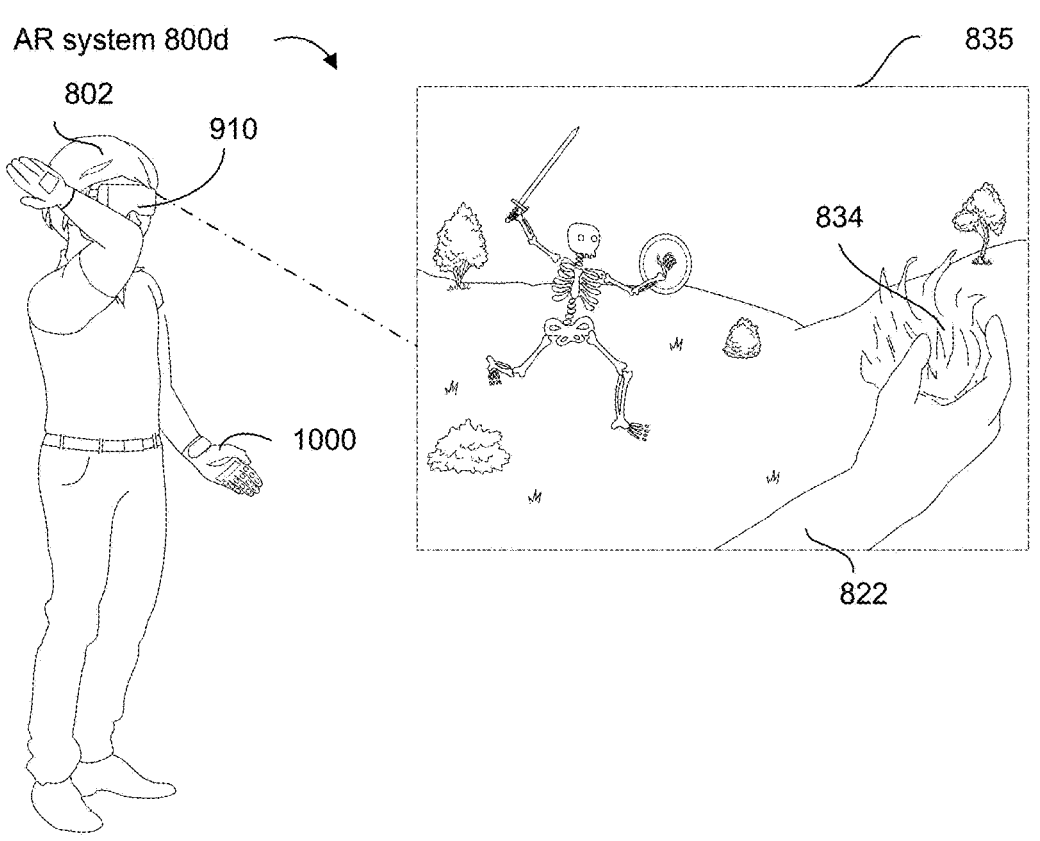
Figures 2, 8B:
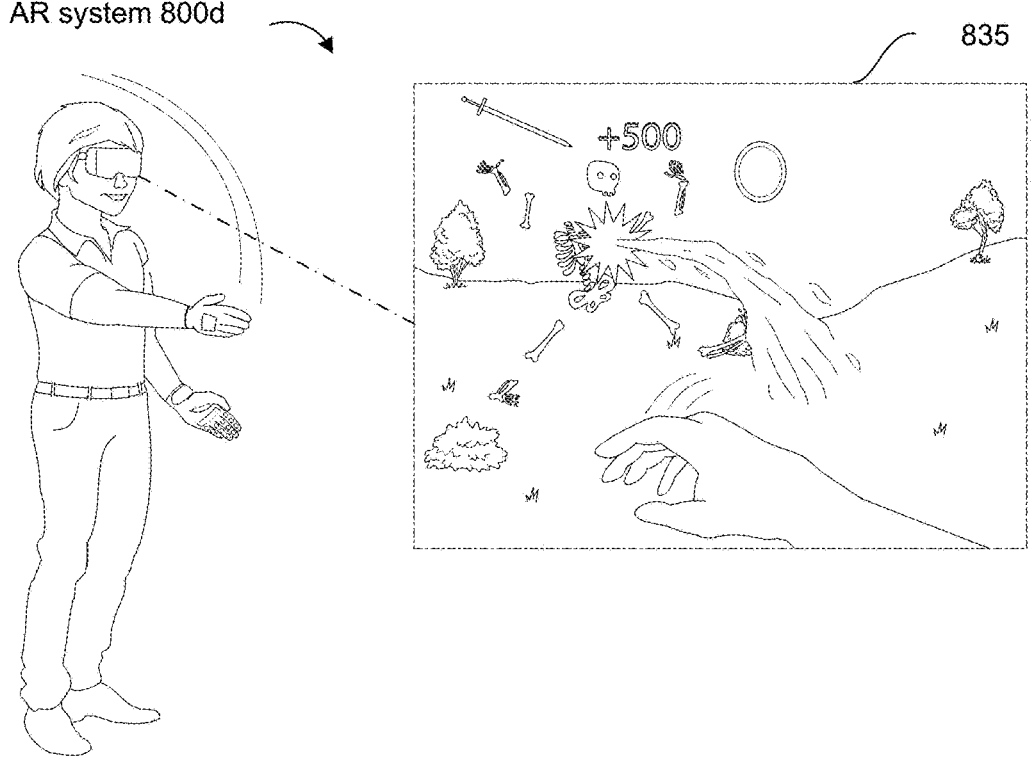

FIGS. 8A, 8B-1, and 8B-2 illustrate example AR systems, in accordance with some embodiments. FIG. 8A shows a first AR system 800a and first example user interactions using a head-wearable device (e.g., AR device 900) and a smart textile-based garment 1000 (e.g., wearable gloves, haptic gloves). FIGS. 8B-1 and 8B-2 show another AR system 800d and another example user interactions using a VR device 910, and/or a smart textile-based garment 1000. As the skilled artisan will appreciate upon reading the descriptions provided herein, the above-example AR systems (described in detail below) can perform various functions and/or operations described above with reference to FIGS. 1-7C.

The smart textile-based garment 1000 and its one or more components are described below in reference to FIGS. 10A-10C. The head-wearable devices and smart textile-based garment 1000 can communicatively couple via a network 825 (e.g., cellular, near field, Wi-Fi, personal area network, or wireless LAN). Additionally, head-wearable devices and smart textile-based garments 1000 can also communicatively couple with one or more servers 830, computers 840 (e.g., laptops or computers), mobile devices 850 (e.g., smartphones or tablets), and/or other electronic devices via the network 825 (e.g., cellular, near field, Wi-Fi, personal area network, or wireless LAN).

Turning to FIG. 8A, a user 802 is shown wearing the smart textile-based garment 1000 and the AR device 900. The AR device 900 facilitates user interaction with an AR environment. In particular, as shown by the first AR system 800a, the AR device 900 causes presentation of one or more avatars 804, digital representations of contacts 806, and virtual objects 808. As discussed below, the user 802 can interact with the one or more avatars 804, digital representations of the contacts 806, and virtual objects 808 via the smart textile-based garment 1000 and/or the AR device.

The user 802 can use the smart textile-based garment 1000 and/or the AR device 900 to provide user inputs. For example, the user 802 can perform one or more hand gestures that are detected by the smart textile-based garment 1000 (e.g., using one or more EMG sensors and/or IMUs)

and/or AR device 900 (e.g., using one or more image sensors or cameras, described below in reference to FIGS. 9A-9B) to provide a user input. Alternatively, or additionally, the user 802 can provide a user input via one or more touch surfaces of the AR device 900, and/or voice commands captured by a microphone of the AR device 900. In some embodiments, the AR device 900 includes a digital assistant to help the user in providing a user input (e.g., completing a sequence of operations, suggesting different operations or commands, providing reminders, or confirming a command). In some embodiments, the user 802 can provide a user input via one or more facial gestures and/or facial expressions. For example, cameras of the smart textile-based garment 1000 and the AR device 900 can track the user 802's eyes for navigating a user interface.

The smart textile-based garment 1000 and the AR device 900 can operate alone or in conjunction to allow the user 802 to interact with the AR environment. In some embodiments, the smart textile-based garment 1000 is configured to operate as a central hub or control center for the AR device 900, and/or another communicatively coupled device. For example, the user 802 can provide an input to interact with the AR environment at the smart textile-based garment 1000 and the AR device 900, and the smart textile-based garment 1000 can identify one or more back-end and front-end tasks to cause the performance of the requested interaction and distribute instructions to cause the performance of the one or more back-end and front-end tasks at the smart textile-based garment 1000, and the AR device 900. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). The smart textile-based garment 1000 can perform the back-end tasks and provide the AR device 900 operational data corresponding to the performed back-end tasks such that the AR device 900 can perform the front-end tasks. In this way, the smart textile-based garment 1000, which has more computational resources and greater thermal headroom than the AR device 900, performs computationally intensive tasks and reduces the computer resource utilization and/or power usage of the wrist-wearable device [$$]00 and/or the AR device 900.

In the example shown by the first AR system 800a, the smart textile-based garment 1000 identifies one or more back-end tasks and front-end tasks associated with a user request to initiate an AR video call with one or more other users (represented by the avatar 804 and the digital representation of the contact 806) and distributes instructions to cause the performance of the one or more back-end tasks and front-end tasks. In particular, the smart textile-based garment 1000 performs back-end tasks for processing and/or rendering image data (and other data) associated with the AR video call and provides operational data associated with the performed back-end tasks to the AR device 900 such that the AR device 900 performs front-end tasks for presenting the AR video call (e.g., presenting the avatar 804 and the digital representation of the contact 806).

User inputs provided at the smart textile-based garment 1000 and/or the AR device 900 are coordinated such that the user can use any device to initiate, continue, and/or complete an operation. For example, the user 802 can provide a user input to the AR device 900 to cause the AR device 900 to present the virtual object 808 and, while the virtual object 808 is presented by the AR device 900, the user 802 can provide one or more hand gestures via the smart textile-based garment 1000 to interact and/or manipulate the virtual object 808.

FIG. 8B shows the user 802 wearing the smart textile-based garment 1000 and the AR device 900. In the second AR system 800b, the smart textile-based garment 1000 and/or the AR device 900 are used to receive and/or provide one or more messages to a contact of the user 802. In particular, the smart textile-based garment 1000 and/or the AR device 900 detect and coordinate one or more user inputs to initiate a messaging application and prepare a response to a received message via the messaging application.

In some embodiments, the user 802 initiates, via a user input, an application on the smart textile-based garment 1000 and/or the AR device 900 that causes the application to initiate on at least one device. For example, in the second AR system 800b, the user 802 performs a hand gesture associated with a command for initiating a messaging application (represented by messaging user interface 812), the smart textile-based garment 1000 detects the hand gesture, and, based on a determination that the user 802 is wearing AR device 900, causes the AR device 900 to present a messaging user interface 812 of the messaging application. The AR device 900 can present the messaging user interface 812 to the user 802 via its display (e.g., as shown by user 802's field of view). In some embodiments, the application is initiated and can be run on the device (e.g., the smart textile-based garment 1000 and/or the AR device 900) that detects the user input to initiate the application, and the device provides another device operational data to cause the presentation of the messaging application. For example, the smart textile-based garment 1000 can detect the user input to initiate a messaging application, initiate and run the messaging application, and provide operational data to the AR device 900 to cause presentation of the messaging application. Alternatively, the application can be initiated and run at a device other than the device that detected the user input. For example, the smart textile-based garment 1000 can detect the hand gesture associated with initiating the messaging application and cause the AR device 900 to run the messaging application and coordinate the presentation of the messaging application.

Further, the user 802 can provide a user input provided at the smart textile-based garment 1000 and/or the AR device 900 to continue and/or complete an operation initiated at another device. For example, after initiating the messaging application via the smart textile-based garment 1000 and while the AR device 900 presents the messaging user interface 812, the user 802 can provide an input at the smart textile-based garment 1000 to prepare a response (e.g., shown by the swipe gesture performed on the smart textile-based garment 1000). The user 802's gestures performed on the smart textile-based garment 1000 can be provided and/or displayed on another device. For example, the user 802's swipe gestures performed on the smart textile-based garment 1000 are displayed on a virtual keyboard of the messaging user interface 812 displayed by the AR device 900.

In some embodiments, the smart textile-based garment 1000, the AR device 900, and/or other communicatively coupled devices can present one or more notifications to the user 802. The notification can be an indication of a new message, an incoming call, an application update, a status update, etc. The user 802 can select the notification via the smart textile-based garment 1000 or the AR device 900 and cause presentation of an application or operation associated with the notification on at least one device. For example, the user 802 can receive a notification that a message was received at the smart textile-based garment 1000, the AR device 900, and/or other communicatively coupled device and provide a user input at the smart textile-based garment 1000 and/or the AR device 900 to review the notification, and the device detecting the user input can cause an application associated with the notification to be initiated and/or presented at the smart textile-based garment 1000 and/or the AR device 900.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 900 can present to the user 802 game application data and the smart textile-based garment 1000 can provide inputs to the game. Similarly, the user 802 can use the smart textile-based garment 1000 to initiate a camera of the AR device 900, and the user can use the smart textile-based garment 1000 and/or the AR device 900 to manipulate the image capture (e.g., zoom in or out or apply filters) and capture image data.

In FIGS. 8B-1 and 8B-2, the user 802 is shown wearing the wrist-wearable device [$$]00, the VR device 910, and smart textile-based garments 1000. In the fourth AR system 800*d*, the wrist-wearable device [$$]00, the VR device 910, and/or the smart textile-based garments 1000 are used to interact within an AR environment (e.g., any AR system described above in reference to FIGS. 8A-8C-2, as well as [INCLUDE ANY RELEVANT FIGURES]). While the VR device 910 presents a representation of a VR game (e.g., second AR game environment 835) to the user 802, the wrist-wearable device [$$]00, the VR device 910, and/or the smart textile-based garments 1000 detect and coordinate one or more user inputs to allow the user 802 to interact with the AR environment.

In some embodiments, the user 802 can provide a user input via the wrist-wearable device [$$]00, the VR device 910, and/or the smart textile-based garments 1000 that causes an action in a corresponding AR environment. For example, the user 802 in the fourth AR system 800*d* (shown in FIG. 8B-1) raises a hand wearing the smart textile-based garments 1000 to prepare to cast a spell or throw an object within the second AR game environment 835. The VR device 910, responsive to the user 802 holding up their hand (wearing smart textile-based garments 1000), causes the AR representation of the user 822 to perform a similar action (e.g., hold a virtual object or throw a fireball 834). In some embodiments, each device uses respective sensor data and/or image data to detect the user input and provides an accurate representation of the user 802's motion.

In FIG. 8B-2, the user 802 performs a throwing motion while wearing the smart textile-based garment 1000. The user 802's throwing motion is detected by the VR device 910 and/or the smart textile-based garments 1000, and a corresponding action is performed in the second AR game environment 835. As described above, the data captured by each device is used to improve the user's experience within the AR environment. Although not shown, the smart textile-based garments 1000 can be used in conjunction with an AR device 900.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Head-Wearable Devices

FIGS. 9A, 9B-1, 9B-2, and 9C show example head-wearable devices, in accordance with some embodiments. Head-wearable devices can include, but are not limited to, AR devices 900 (e.g., AR or smart eyewear devices, such as smart glasses, smart monocles, smart contacts, etc.), VR devices 910 (e.g., VR headsets or head-mounted displays (HMDs)), or other ocularly coupled devices. The AR devices 900 and the VR devices 910 can perform various functions and/or operations associated with navigating through user interfaces and selectively opening applications, as well as the functions and/or operations.

In some embodiments, an AR system (e.g., FIGS. 8A-8B-2; AR systems 800*a*-800*d*) includes an AR device 900 (as shown in FIG. 9A) and/or VR device 910 (as shown in FIGS. 9B-1-B-2). In some embodiments, the AR device 900 and the VR device 910 can include one or more analogous components (e.g., components for presenting interactive AR environments, such as processors, memory, and/or presentation devices, including one or more displays and/or one or more waveguides), some of which are described in more detail with respect to FIG. 9C. The head-wearable devices can use display projectors (e.g., display projector assemblies 907A and 907B) and/or waveguides for projecting representations of data to a user. Some embodiments of head-wearable devices do not include displays.

Figure 9A:
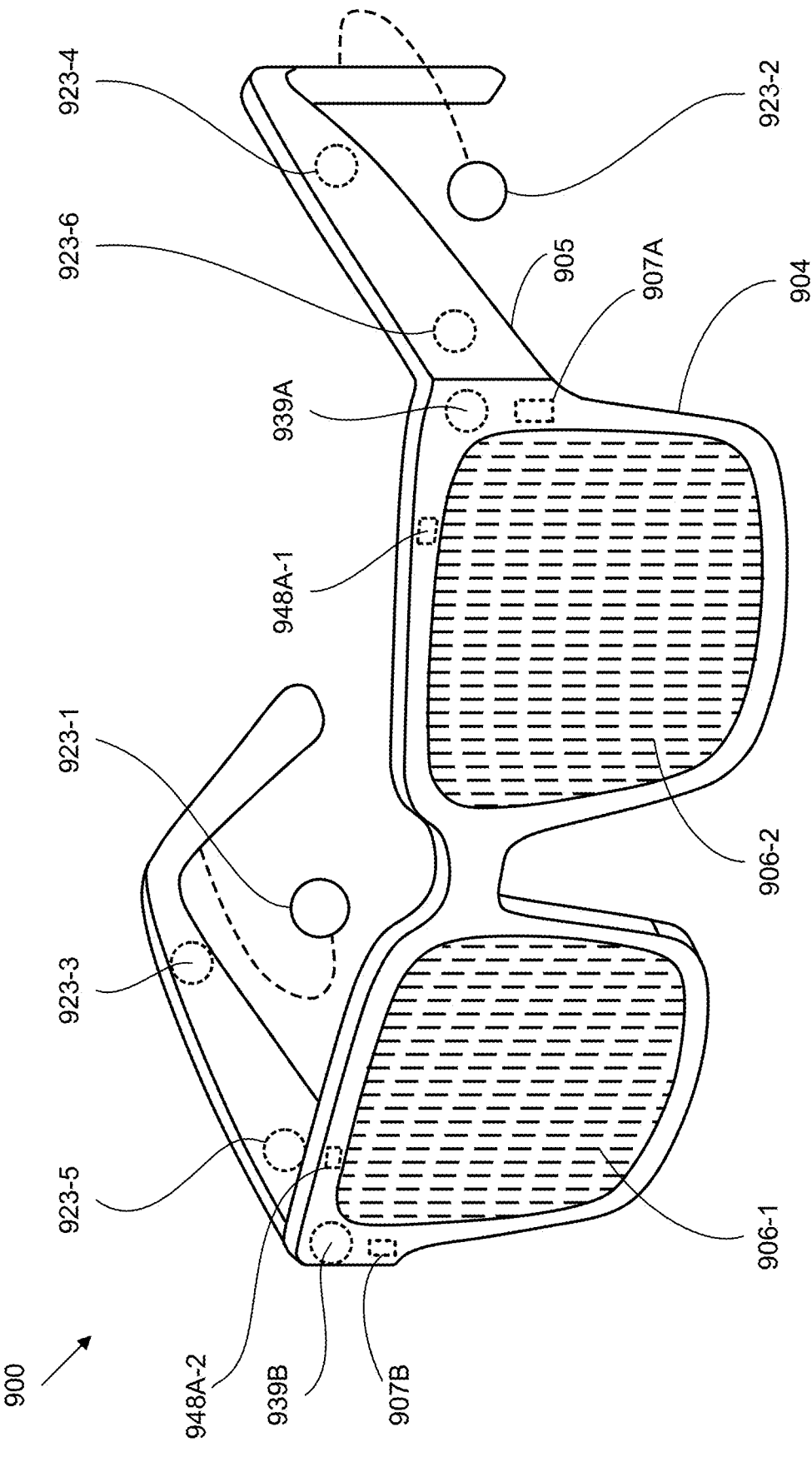

FIG. 9A shows an example visual depiction of the AR device 900 (e.g., which may also be described herein as augmented-reality glasses and/or smart glasses). The AR device 900 can work in conjunction with additional electronic components that are not shown in FIGS. 9A, such as a wearable accessory device and/or an intermediary processing device, in electronic communication or otherwise configured to be used in conjunction with the AR device 900. In some embodiments, the wearable accessory device and/or the intermediary processing device may be configured to couple with the AR device 900 via a coupling mechanism in electronic communication with a coupling sensor 924, where the coupling sensor 924 can detect when an electronic device becomes physically or electronically coupled with the AR device 900. In some embodiments, the AR device 900 can be configured to couple to a housing (e.g., a portion of frame 904 or temple arms 905), which may include one or more additional coupling mechanisms configured to couple with additional accessory devices. The components shown in FIG. 9A can be implemented in hardware, software, firmware, or a combination thereof, including one or more signal-processing components and/or application-specific integrated circuits (ASICs).

The AR device 900 includes mechanical glasses components, including a frame 904 configured to hold one or more lenses (e.g., one or both lenses 906-1 and 906-2). One of ordinary skill in the art will appreciate that the AR device 900 can include additional mechanical components, such as hinges configured to allow portions of the frame 904 of the AR device 900 to be folded and unfolded, a bridge configured to span the gap between the lenses 906-1 and 906-2 and rest on the user's nose, nose pads configured to rest on the bridge of the nose and provide support for the AR device 900, earpieces configured to rest on the user's ears and provide additional support for the AR device 900, temple arms 905 configured to extend from the hinges to the earpieces of the AR device 900, and the like. One of ordinary skill in the art will further appreciate that some examples of the AR device 900 can include none of the mechanical components described herein. For example, smart contact lenses configured to present AR to users may not include any components of the AR device 900.

The lenses 906-1 and 906-2 can be individual displays or display devices (e.g., a waveguide for projected representations). The lenses 906-1 and 906-2 may act together or independently to present an image or series of images to a user. In some embodiments, the lenses 906-1 and 906-2 can operate in conjunction with one or more display projector assemblies 907A and 907B to present image data to a user. While the AR device 900 includes two displays, embodiments of this disclosure may be implemented in AR devices with a single near-eye display (NED) or more than two NEDs.

The AR device 900 includes electronic components, many of which will be described in more detail below with respect to FIG. 9C. Some example electronic components are illustrated in FIG. 9A, including sensors 923-1, 923-2, 923-3, 923-4, 923-5, and 923-6, which can be distributed along a substantial portion of the frame 904 of the AR device 900. The different types of sensors are described below in reference to FIG. 9C. The AR device 900 also includes a left camera 939A and a right camera 939B, which are located on different sides of the frame 904. And the eyewear device includes one or more processors 948A and 948B (e.g., an integral microprocessor, such as an ASIC) that is embedded into a portion of the frame 904.

Figures 1, 9B:
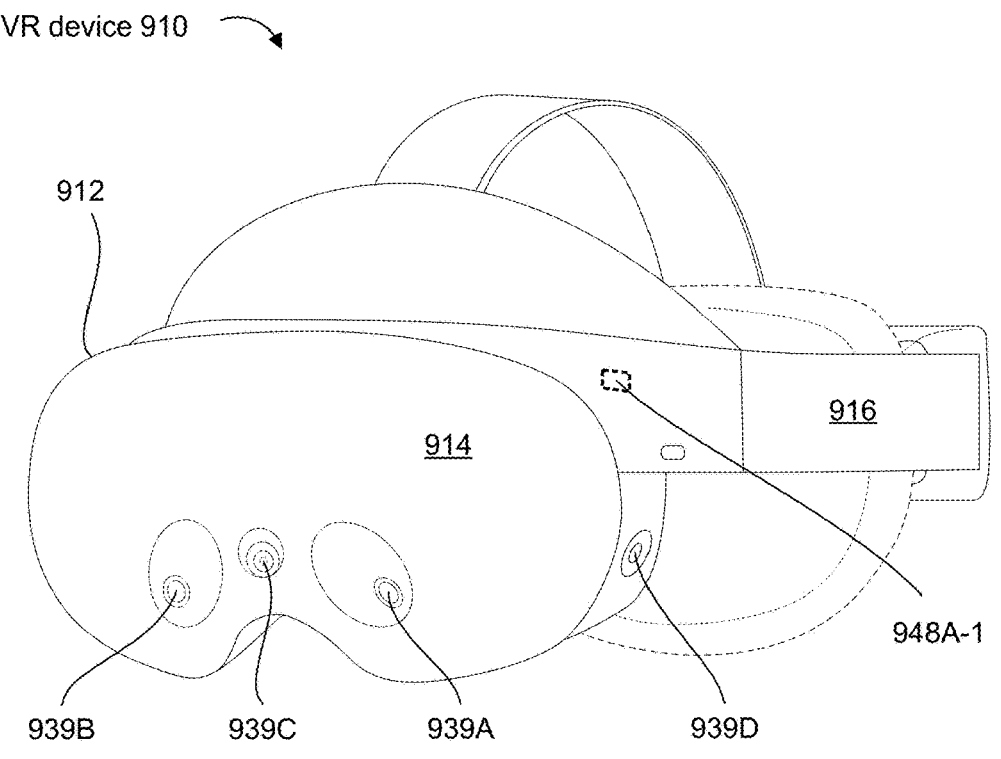
Figures 2, 9B:
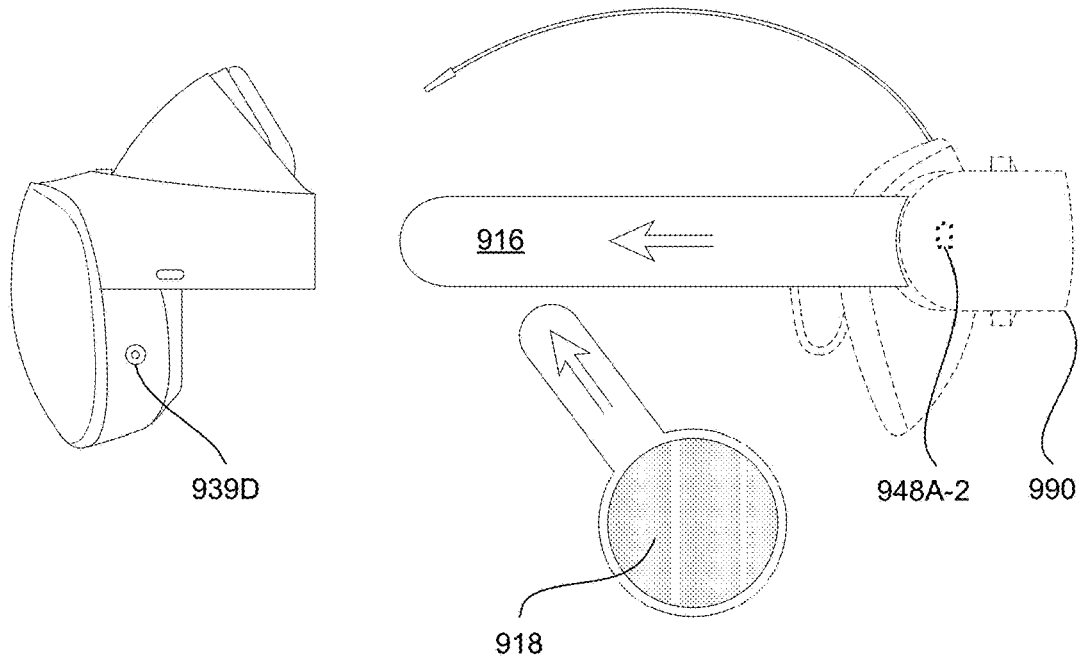

FIGS. 9B-1 and 9B-2 show an example visual depiction of the VR device 910 (e.g., a head-mounted display (HMD) 912, also referred to herein as an AR headset, a head-wearable device, or a VR headset). The HMD 912 includes a front body 914 and a frame 916 (e.g., a strap or band) shaped to fit around a user's head. In some embodiments, the front body 914 and/or the frame 916 includes one or more electronic elements for facilitating presentation of and/or interactions with an AR and/or VR system (e.g., displays, processors (e.g., processor 948A-1), IMUs, tracking emitters or detectors, or sensors). In some embodiments, the HMD 912 includes output audio transducers (e.g., an audio transducer 918-1), as shown in FIG. 9B-2. In some embodiments, one or more components, such as the output audio transducer(s) 918 and the frame 916, can be configured to attach and detach (e.g., are detachably attachable) to the HMD 912 (e.g., a portion or all of the frame 916 and/or the output audio transducer 918), as shown in FIG. 9B-2. In some embodiments, coupling a detachable component to the HMD 912 causes the detachable component to come into electronic communication with the HMD 912. The VR device 910 includes electronic components, many of which will be described in more detail below with respect to FIG. 9C.

FIGS. 9B-1 and 9B-2 also show that the VR device 910 having one or more cameras, such as the left camera 939A and the right camera 939B, which can be analogous to the left and right cameras on the frame 904 of the AR device 900. In some embodiments, the VR device 910 includes one or more additional cameras (e.g., cameras 939C and 939D), which can be configured to augment image data obtained by the cameras 939A and 939B by providing more information. For example, the camera 939C can be used to supply color information that is not discerned by cameras 939A and 939B. In some embodiments, one or more of the cameras 939A to 939D can include an optional IR (infrared) cut filter configured to remove IR light from being received at the respective camera sensors.

The VR device 910 can include a housing 990 storing one or more components of the VR device 910 and/or additional components of the VR device 910. The housing 990 can be a modular electronic device configured to couple with the VR device 910 (or an AR device 900) and supplement and/or extend the capabilities of the VR device 910 (or an AR device 900). For example, the housing 990 can include additional sensors, cameras, power sources, and processors (e.g., processor 948A-2). to improve and/or increase the functionality of the VR device 910. Examples of the different components included in the housing 990 are described below in reference to FIG. 9C.

Alternatively, or in addition, in some embodiments, the head-wearable device, such as the VR device 910 and/or the AR device 900, includes, or is communicatively coupled to, another external device (e.g., a paired device), such as a smart textile-based garment 1000 and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, handheld controllers, tablet computers, or laptop computers.

In some situations, pairing external devices, such as an intermediary processing device (e.g., a smart textile-based garment 1000, an optional neckband, and/or a wearable accessory device) with the head-wearable devices (e.g., an AR device 900 and/or a VR device 910) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat pro-file, and form factor of the head-wearable device overall while allowing the head-wearable device to retain its desired functionality. For example, the intermediary processing device (e.g., a smart textile-based garment 1000) can allow components that would otherwise be included in a head-wearable device to be included in the intermediary process-ing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight car-ried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodi-ments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as a smart textile-based garment 1000, can process information gener-ated by one or more of its sensors and/or information provided by other communicatively coupled devices. For example, a head-wearable device can include an IMU, and the intermediary processing device (a smart textile-based garment 1000 and/or a neckband) can compute all inertial and spatial calculations from the IMUs located on the head-wearable device. Additional examples of processing performed by a communicatively coupled device, such as the smart textile-based garment 1000, are provided below in reference to FIGS. 8A and 8B.

AR systems may include a variety of types of visual feedback mechanisms. For example, display devices in the AR devices 900 and/or the VR devices 910 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for addi-tional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 900 and/or the VR device 910 may include micro- LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an arti-ficial reality with actual reality, substantially replace one or more of a user's sensory perceptions of the real world with a virtual experience.

While the example head-wearable devices are respec-tively described herein as the AR device 900 and the VR device 910, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 900 and/or the VR device 910 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be imple-mented using motors, piezoelectric actuators, fluidic sys-tems, and/or a variety of other types of feedback mecha-nisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a smart textile-based garment 1000), and/or other devices described herein.

Figure 9C:
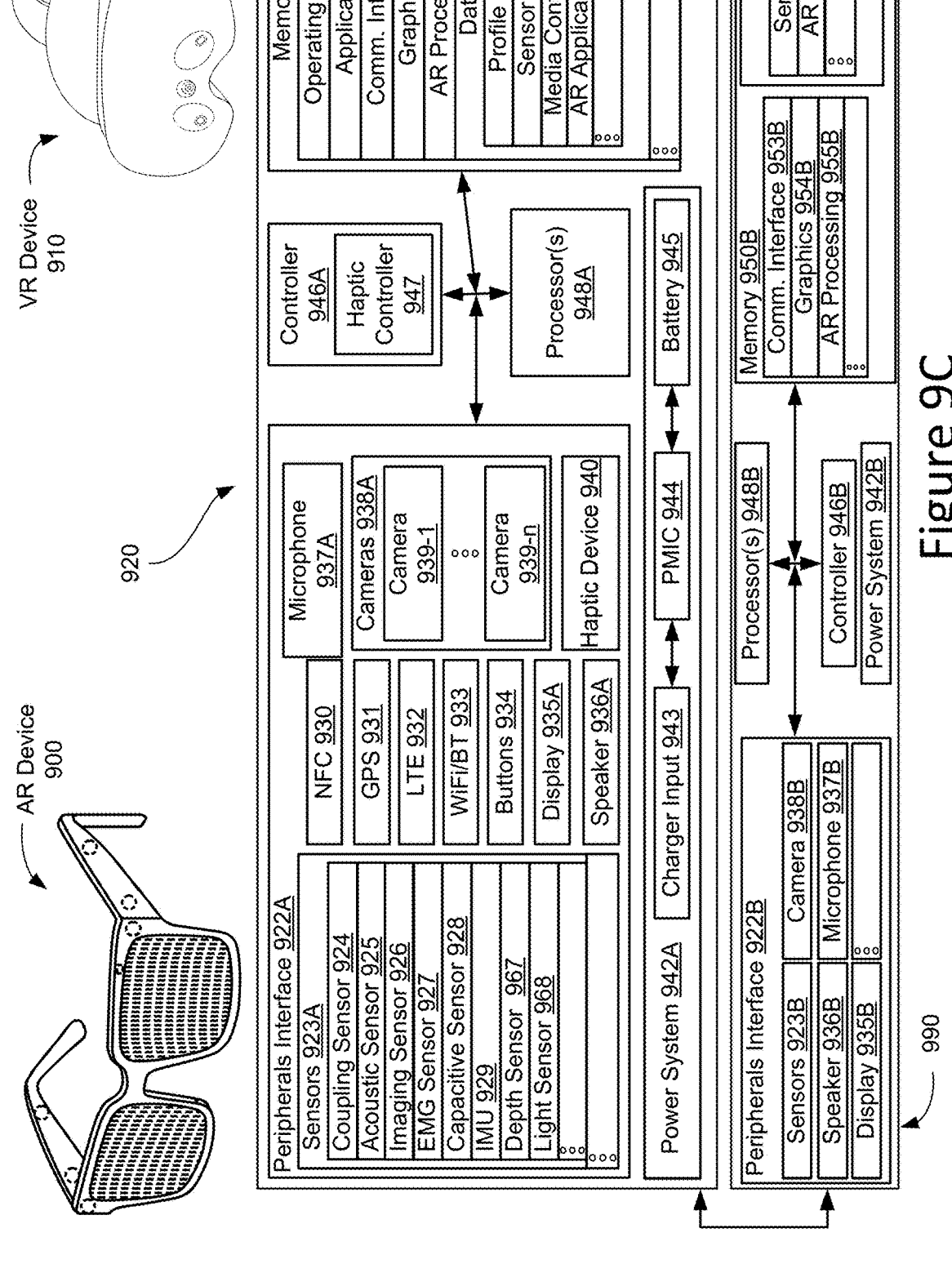

FIG. 9C illustrates a computing system 920 and an optional housing 990, each of which shows components that can be included in a head-wearable device (e.g., the AR device 900 and/or the VR device 910). In some embodi-ments, more or fewer components can be included in the optional housing 990 depending on practical restraints of the respective head-wearable device being described. Addition-ally or alternatively, the optional housing 990 can include additional components to expand and/or augment the func-tionality of a head-wearable device.

In some embodiments, the computing system 920 and/or the optional housing 990 can include one or more peripheral interfaces 922A and 922B, one or more power systems 942A and 942B (including charger input 943, PMIC 944, and battery 945), one or more controllers 946A and 946B (including one or more haptic controllers 947), one or more processors 948A and 948B (as defined above, including any of the examples provided), and memory 950A and 950B, which can all be in electronic communication with each other. For example, the one or more processors 948A and/or 948B can be configured to execute instructions stored in the memory 950A and/or 950B, which can cause a controller of the one or more controllers 946A and/or 946B to cause operations to be performed at one or more peripheral devices of the peripherals interfaces 922A and/or 922B. In some embodiments, each operation described can occur based on electrical power provided by the power system 942A and/or 942B.

In some embodiments, the peripherals interface 922A can include one or more devices configured to be part of the computing system 920, many of which have been defined above and/or described with respect to smart textile-based garments shown in FIGS. 8A and 8B. For example, the peripherals interface can include one or more sensors 923A. Some example sensors include one or more coupling sensors 924, one or more acoustic sensors 925, one or more imaging sensors 926, one or more EMG sensors 927, one or more capacitive sensors 928, and/or one or more IMUs 929. In some embodiments, the sensors 923A further include depth sensors 967, light sensors 968, and/or any other types of sensors defined above or described with respect to any other embodiments discussed herein.

In some embodiments, the peripherals interface can include one or more additional peripheral devices, including one or more NFC devices 930, one or more GPS devices 931, one or more LTE devices 932, one or more Wi-Fi and/or Bluetooth devices 933, one or more buttons 934 (e.g., including buttons that are slidable or otherwise adjustable), one or more displays 935A, one or more speakers 936A, one or more microphones 937A, one or more cameras 938A (e.g., including the first camera 939-1 through nth camera 939-n, which are analogous to the left camera 939A and/or the right camera 939B), one or more haptic devices 940, and/or any other types of peripheral devices defined above or described with respect to any other embodiments discussed herein.

The head-wearable devices can include a variety of types of visual feedback mechanisms (e.g., presentation devices). For example, display devices in the AR device 900 and/or the VR device 910 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 935A can be coupled to each of the lenses 906-1 and 906-2 of the AR device 900. The displays 935A coupled to each of the lenses 906-1 and 906-2 can act together or independently to present an image or series of images to a user. In some embodiments, the AR device 900 and/or the VR device 910 includes a single display 935A (e.g., a near-eye display) or more than two displays 935A.

In some embodiments, a first set of one or more displays 935A can be used to present an augmented-reality environment, and a second set of one or more display devices 935A can be used to present a VR environment. In some embodiments, one or more waveguides are used in conjunction with presenting AR content to the user of the AR device 900 and/or the VR device 910 (e.g., as a means of delivering light from a display projector assembly and/or one or more displays 935A to the user's eyes). In some embodiments, one or more waveguides are fully or partially integrated into the AR device 900 and/or the VR device 910. Additionally, or alternatively, to display screens, some AR systems include one or more projection systems. For example, display devices in the AR device 900 and/or the VR device 910 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 935A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 935A for presenting information to users. For example, an external display 935A can be used to show a current battery level, network activity (e.g., connected, disconnected), current activity (e.g., playing a game, in a call, in a meeting, or watching a movie), and/or other relevant information. In some embodiments, the external displays 935A can be used to communicate with others. For example, a user of the head-wearable device can cause the external displays 935A to present a "do not disturb" notification. The external displays 935A can also be used by the user to share any information captured by the one or more components of the peripherals interface 922A and/or generated by the head-wearable device (e.g., during operation and/or performance of one or more applications).

The memory 950A can include instructions and/or data executable by one or more processors 948A (and/or processors 948B of the housing 990) and/or a memory controller of the one or more controllers 946A (and/or controller 946B of the housing 990). The memory 950A can include one or more operating systems 951, one or more applications 952, one or more communication interface modules 953A, one or more graphics modules 954A, one or more AR processing modules 955A and/or any other types of modules or components defined above or described with respect to any other embodiments discussed herein.

The data 960 stored in memory 950A can be used in conjunction with one or more of the applications and/or programs discussed above. The data 960 can include profile data 961, sensor data 962, media content data 963, AR application data 964 and/or any other types of data defined above or described with respect to any other embodiments discussed herein.

In some embodiments, the controller 946A of the head-wearable devices processes information generated by the sensors 923A on the head-wearable devices and/or another component of the head-wearable devices and/or communicatively coupled with the head-wearable devices (e.g., components of the housing 990, such as components of peripherals interface 922B). For example, the controller 946A can process information from the acoustic sensors 925 and/or image sensors 926. For each detected sound, the controller 946A can perform a direction of arrival (DOA) estimation to estimate a direction from which the detected sound arrived at a head-wearable device. As one or more of the acoustic sensors 925 detect sounds, the controller 946A can populate an audio data set with the information (e.g., represented by sensor data 962).

In some embodiments, a physical electronic connector can convey information between the head-wearable devices and another electronic device, and/or between one or more processors 948A of the head-wearable devices and the controller 946A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., a smart textile-based garment 1000 or an electronic neckband) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 900 and/or the VR device 910 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 9B-1 and 9B-2 show the VR device 910 having cameras 939A-939D, which can be used to provide depth information for creating a voxel field and a 2D mesh to provide object information to the user to avoid collisions.

The optional housing 990 can include analogous components to those describe above with respect to the computing system 920. For example, the optional housing 990 can include a respective peripherals interface 922B, including more or fewer components to those described above with respect to the peripherals interface 922A. As described above, the components of the optional housing 990 can be used to augment and/or expand on the functionality of the head-wearable devices. For example, the optional housing 990 can include respective sensors 923B, speakers 936B, displays 935B, microphones 937B, cameras 938B, and/or other components to capture and/or present data. Similarly, the optional housing 990 can include one or more processors 948B, controllers 946B, and/or memory 950B (including respective communication interface modules 953B, one or more graphics modules 954B, one or more AR processing modules 955B) that can be used individually and/or in conjunction with the components of the computing system 920.

The techniques described above in FIGS. 9A-9C can be used with different head-wearable devices. In some embodiments, the head-wearable devices (e.g., the AR device 900 and/or the VR device 910) can be used in conjunction with one or more wearable devices such as a smart textile-based garment 1000 (FIGS. 10A-10C) Having thus described example the head-wearable devices, attention will now be turned to example feedback devices, such as smart textile-based garment 1000.

Example Smart Textile-Based Garments

Figure 10B:
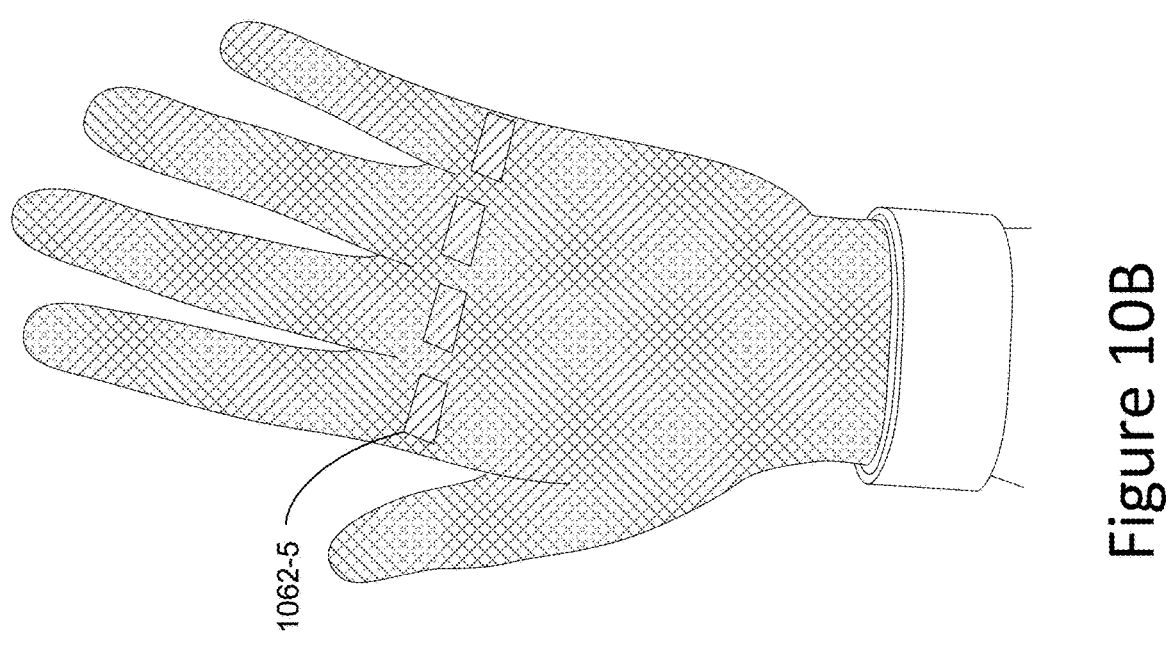
FIGS. 10A, 10B, and 10C illustrate an example smart textile-based garment, in accordance with some embodiments.
Figure 10A:
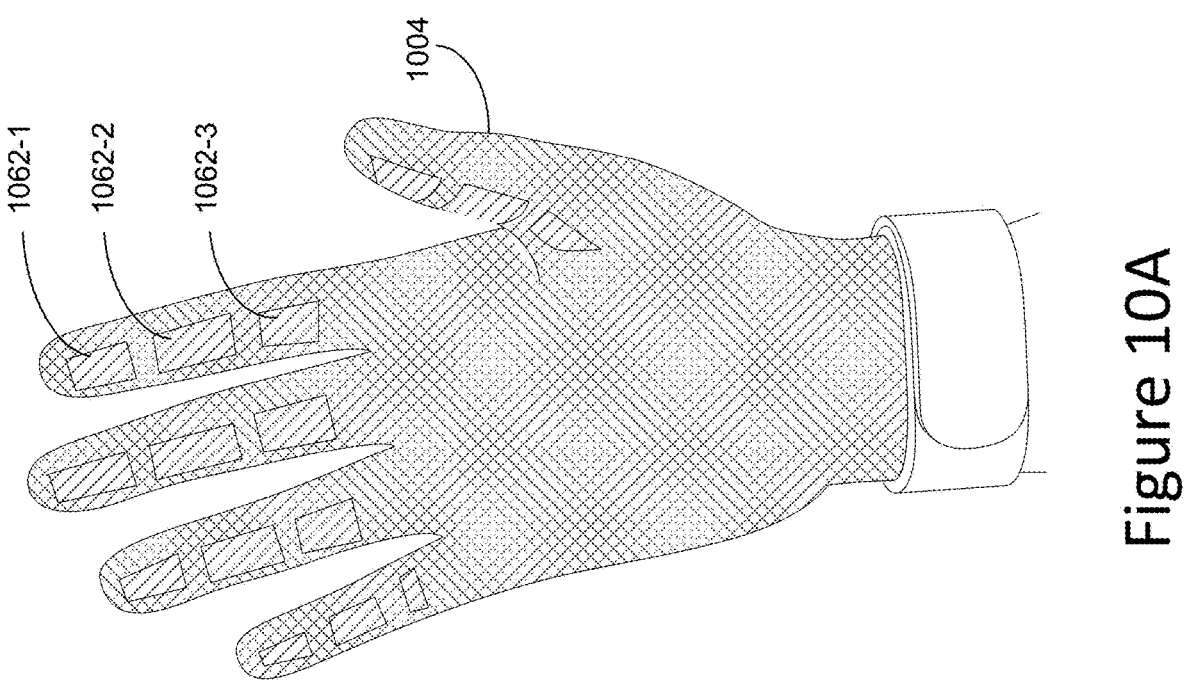

FIGS. 10A and 10B illustrate an example smart textile-based garment, in accordance with some embodiments. The smart textile-based garment 1000 (e.g., wearable gloves, a shirt, a headband, a wristbands, socks, etc.) is configured to communicatively couple with one or more electronic devices, such as a head-wearable device, a laptop, tablet, and/or other computing devices. The smart textile-based garment 1000 is an instance of the wearable glove device described in reference to FIGS. 1A-7C herein, such that the smart textile-based garment 1000 should be understood to have the features described with respect to any smart textile-based garment defined above or otherwise described herein, and vice versa. The smart textile-based garment 1000 can perform various functions and/or operations associated with navigating through user interfaces and selectively opening applications, as well as the functions and/or operations described above with reference to FIGS. 8A and 8B.

The smart textile-based garment 1000 can be part of an AR system, such as AR system 800d described above in reference to FIGS. 8B-1 and 8B-2. The smart textile-based garment 1000 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1000 receives instructions from a communicatively coupled device (e.g., a head-wearable device) for causing the performance of a feedback response. Alternatively, or in addition, in some embodiments, the smart textile-based garment 1000 determines one or more feedback responses to provide a user. The smart textile-based garment 1000 can determine the one or more feedback responses based on sensor data captured by one or more of its sensors (e.g., sensors 1051; FIG. 10C) or communicatively coupled sensors (e.g., sensors of a head-wearable device and/or other computing device).

Non-limiting examples of the feedback determined by the smart textile-based garment 1000 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1000 can include respective feedback devices (e.g., a haptic device or assembly 1062 or other feedback devices or assemblies) to provide the feedback responses to the user. Similarly, the smart textile-based garment 1000 can communicatively couple with another device (and/or the other device's feedback devices) to coordinate the feedback provided to the user. For example, a VR device 910 can present an AR environment to a user and as the user interacts with objects within the AR environment, such as a virtual cup, the smart textile-based garment 1000 provides respective response to the user. In particular, the smart textile-based garment 1000 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 1000 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 8A and 8B.

FIG. 10A shows one or more haptic assemblies 1062 (e.g., first through fourth haptic assemblies 1062-1 through 1062-4) on a portion of the smart textile-based garment 1000 adjacent to a palmar side of the user's hand and FIG. 10B shows additional haptic assemblies (e.g., a fifth haptic assembly 1062-5) on a portion of the smart textile-based garment 1000 adjacent to a dorsal side of the user's hand. In some embodiments, the haptic assemblies 1062 include a mechanism that, at a minimum, provide resistance when a respective haptic assembly 1062 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1062 described can transition between a first pressurized state and a second pressurized state to provide haptic feedback to the user. Structures of haptic assemblies 1062 can be integrated into various devices configured to be in contact or proximity to a user's skin, including, but not limited to devices such as a glove worn devices, body worn clothing device, headset devices. Each of the haptic assemblies 1062 can be included in or physically coupled to a garment component 1004 of the smart textile-based garment 1000. For example, each of the haptic assemblies 1062-1, 1062-2, 1062-3, . . . 1062-N are physically coupled to the garment 1004 are configured to contact respective phalanges of a user's thumb and fingers.

Due to the ever-changing nature of artificial-reality, the haptic assemblies 1062 may be required to transition between the multiple states hundreds, or perhaps thousands of times, during a single use. Thus, the haptic assemblies 1062 described herein are durable and designed to quickly transition from state to state. To provide some context, in a first pressurized state, the haptic assemblies 1062 do not impede free movement of a portion of the wearer's body. For example, one or more haptic assemblies 1062 incorporated into a glove are made from flexible materials that do not impede free movement of the wearer's hand and fingers (e.g., an electrostatic-zipping actuator). The haptic assemblies 1062 are configured to conform to a shape of the portion of the wearer's body when in the first pressurized state. However, once in a second pressurized state, the haptic assemblies 1062 can be configured to restrict and/or impede free movement of the portion of the wearer's body (e.g., appendages of the user's hand). For example, the respective haptic assembly 1062 (or multiple respective haptic assemblies) can restrict movement of a wearer's finger (e.g., prevent the finger from curling or extending) when the haptic assembly 1062 is in the second pressurized state. Moreover, once in the second pressurized state, the haptic assemblies 1062 may take different shapes, with some haptic assemblies 1062 configured to take a planar, rigid shape (e.g., flat and rigid), while some other haptic assemblies 1062 are configured to curve or bend, at least partially.

The smart textile-based garment 1000 can be one of a plurality of devices in an AR system (e.g., AR systems of FIGS. 8A-8B-2). For example, a user can wear a pair of gloves (e.g., a first type of smart textile-based garment 1000), wear a headband (e.g., a second type of smart textile-based garment 1000), wear a head-wearable device, etc. As explained above, the haptic assemblies 1062 are configured to provide haptic simulations to a wearer of the smart textile-based garments 1000. The garment 1004 of each smart textile-based garment 1000 can be one of various articles of clothing (e.g., gloves, socks, shirts, pants, etc.). Thus, a user may wear multiple smart textile-based garments 1000 that are each configured to provide haptic stimulations to respective parts of the body where the smart textile-based garments 1000 are being worn. Although the smart textile-based garment 1000 are described as an individual device, in some embodiments, the smart textile-based garment 1000 can be combined with other wearable devices described herein. For example, the smart textile-based garment 1000 can form part of a VR device 910 (e.g., a headband portion).

Figure 10C:
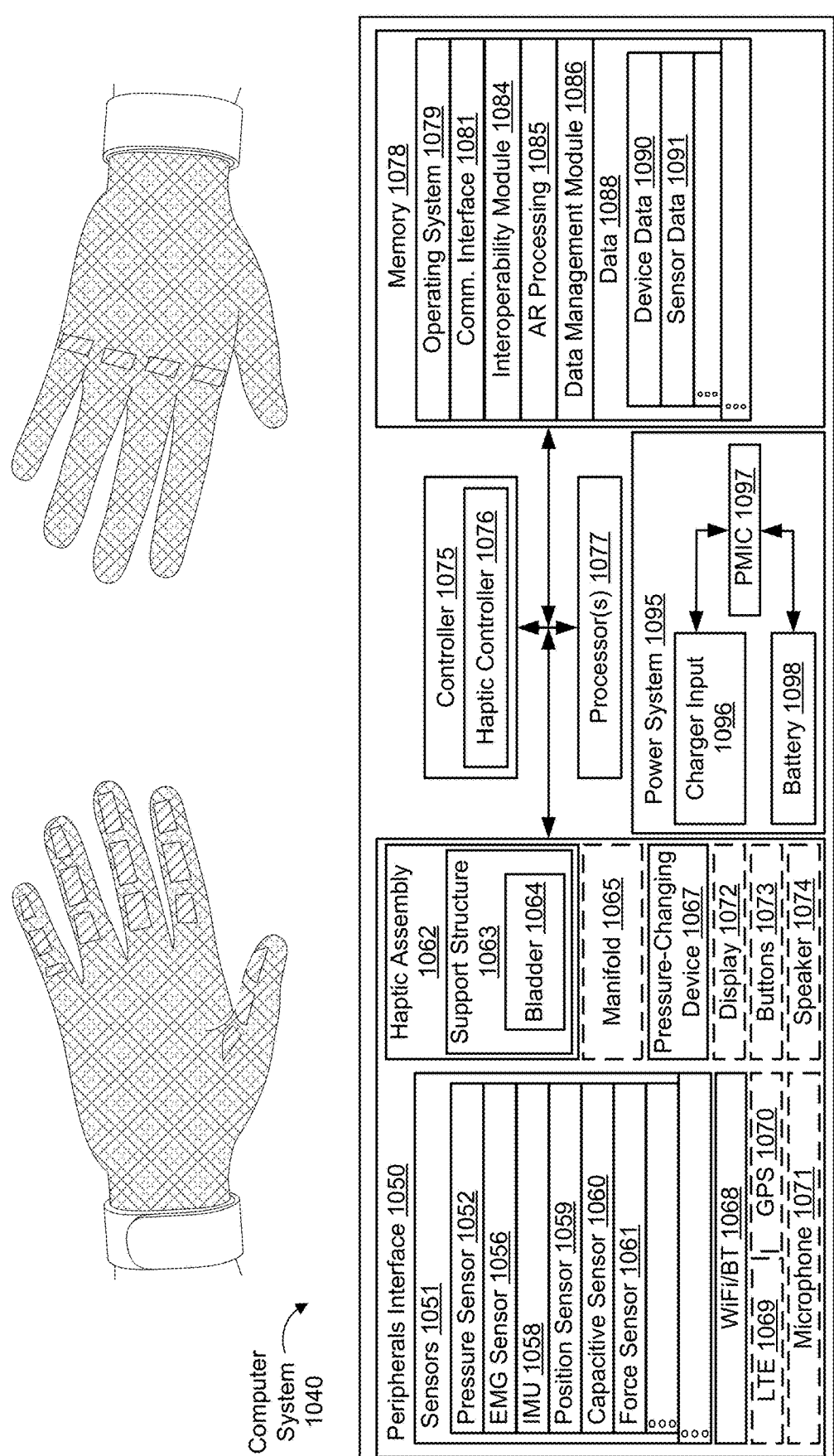

FIG. 10C shows block diagrams of a computing system 1040 of the haptic assemblies 1062, in accordance with some embodiments. The computing system 1040 can include one or more peripheral interfaces 1050, one or more power systems 1095 (including charger input 1096, PMIC 1097, and battery 1098), one or more controllers 1075 (including one or more haptic controllers 1076), one or more processors 1077 (as defined above, including any of the examples provided), and memory 1078, which can all be in electronic communication with each other. For example, the one or more processors 1077 can be configured to execute instructions stored in the memory 1078, which can cause a controller of the one or more controllers 1075 to cause operations to be performed at one or more peripheral devices of the peripherals interface 1050. In some embodiments, each operation described can occur based on electrical power provided by the power system 1095.

In some embodiments, the peripherals interface 1050 can include one or more devices configured to be part of the computing system 1040, many of which have been defined above and/or described with respect to head-wearable devices shown in FIGS. 9A-9B. For example, the peripherals interface 1050 can include one or more sensors 1051, such as one or more pressure sensors 1052, one or more EMG sensors 1056, one or more IMUs 1058, one or more position sensors 1059, one or more capacitive sensors 1060, one or more force sensors 1061; and/or any other types of sensors defined above or described with respect to any other embodiments discussed herein. In some embodiments, the peripherals interface can include one or more additional peripheral devices, including one or more Wi-Fi and/or Bluetooth devices 1068, an LTE component 1069, a GPS component 1070, a microphone 1071, one or more haptic assemblies 1062, one or more support structures 1063 which can include one or more bladders 1064, one or more manifolds 1065, one or more pressure-changing devices 1067, one or more displays 1072, one or more buttons 1073, one or more speakers 1074, and/or any other types of peripheral devices defined above or described with respect to any other embodiments discussed herein. In some embodiments, computing system 1040 includes more or fewer components than those shown in FIG. 10C.

In some embodiments, each haptic assembly 1062 includes a support structure 1063 and at least one bladder 1064. The bladder 1064 (e.g., a membrane) is a sealed, inflatable pocket made from a durable and puncture-resistant material, such as thermoplastic polyurethane (TPU), a flexible polymer, or the like. The bladder 1064 contains a medium (e.g., a fluid such as air, inert gas, or even a liquid) that can be added to or removed from the bladder 1064 to change pressure (e.g., fluid pressure) inside the bladder 1064. The support structure 1063 is made from a material that is stronger and stiffer than the material of the bladder 1064. A respective support structure 1063 coupled to a respective bladder 1064 is configured to reinforce the respective bladder 1064 as the respective bladder changes shape and size due to changes in pressure (e.g., fluid pressure) inside the bladder. The above example haptic assembly 1062 is non-limiting. The haptic assembly 1062 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1000 also includes a haptic controller 1076 and a pressure-changing device 1067. Alternatively, in some embodiments, the computing system 1040 is communicatively coupled with a haptic controller 1076 and/or pressure-changing device 1067 (e.g., in electronic communication with one or more processors 1077 of the computing system 1040). The haptic controller 1076 is configured to control operation of the pressure-changing device 1067, and in turn operation of the smart textile-based garments 1000. For example, the haptic controller 1076 sends one or more signals to the pressure-changing device 1067 to activate the pressure-changing device 1067 (e.g., turn it on and off). The one or more signals can specify a desired pressure (e.g., pounds per square inch) to be output by the pressure-changing device 1067. Generation of the one or more signals, and in turn the pressure output by the pressure-changing device 1067, can be based on information collected by sensors 1051 of the smart textile-based garment 1000 and/or other communicatively coupled device. For example, the haptic controller 1076 can provide one or more signals, based on collected sensor data, to cause the pressure-changing device 1067 to increase the pressure (e.g., fluid pressure) inside a first haptic assembly 1062 at a first time, and provide one or more additional signals, based on additional sensor data, to the pressure-changing device 1067, to cause the pressure-changing device 1067 to further increase the pressure inside a second haptic assembly 1062 at a second time after the first time. Further, the haptic controller 1076 can provide one or more signals to cause the pressure-changing device 1067 to inflate one or more bladders 1064 in a first portion of a smart textile-based garment 1000 (e.g., a first finger), while one or more bladders 1064 in a second portion of the smart textile-based garment 1000 (e.g., a second finger) remain unchanged. Additionally, the haptic controller 1076 can provide one or more signals to cause the pressure-changing device 1067 to inflate one or more bladders 1064 in a first smart textile-based garment 1000 to a first pressure and inflate one or more other bladders 1064 in the first smart textile-based garment 1000 to a second pressure different from the first pressure. Depending on the number of smart textile-based garments 1000 serviced by the pressure-changing device 1067, and the number of bladders therein, many different inflation configurations can be achieved through the one or more signals, and the examples above are not meant to be limiting.

The smart textile-based garment 1000 may include an optional manifold 1065 between the pressure-changing device 1067, the haptic assemblies 1062, and/or other portions of the smart textile-based garment 1000. The manifold 1065 may include one or more valves (not shown) that pneumatically couple each of the haptic assemblies 1062 with the pressure-changing device 1067 via tubing. In some embodiments, the manifold 1065 is in communication with the controller 1075, and the controller 1075 controls the one or more valves of the manifold 1065 (e.g., the controller generates one or more control signals). The manifold 1065 is configured to switchably couple the pressure-changing device 1067 with one or more haptic assemblies 1062 of the smart textile-based garment 1000. In some embodiments, one or more smart textile-based garments 1000 or other haptic devices can be coupled in a network of haptic devices, and the manifold 1065 can distribute the fluid between the coupled smart textile-based garments 1000.

In some embodiments, instead of using the manifold 1065 to pneumatically couple the pressure-changing device 1067 with the haptic assemblies 1062, the smart textile-based garment 1000 may include multiple pressure-changing devices 1067, where each pressure-changing device 1067 is pneumatically coupled directly with a single (or multiple) haptic assembly 1062. In some embodiments, the pressure-changing device 1067 and the optional manifold 1065 can be configured as part of one or more of the smart textile-based garments 1000 (not illustrated) while, in other embodiments, the pressure-changing device 1067 and the optional manifold 1065 can be configured as external to the smart textile-based garments 1000. In some embodiments, a single pressure-changing device 1067 can be shared by multiple smart textile-based garments 1000 or other haptic devices. In some embodiments, the pressure-changing device 1067 is a pneumatic device, hydraulic device, a pneudraulic device, or some other device capable of adding and removing a medium (e.g., fluid, liquid, or gas) from the one or more haptic assemblies 1062.

The memory 1078 includes instructions and data, some or all of which may be stored as non-transitory computer-readable storage media within the memory 1078. For example, the memory 1078 can include one or more operating systems 1079, one or more communication interface applications 1081, one or more interoperability modules 1084, one or more AR processing applications 1085, one or more data-management modules 1086, and/or any other types of data defined above or described with respect to FIGS. 8A-9B.

The memory 1078 also includes data 1088, which can be used in conjunction with one or more of the applications discussed above. The data 1088 can include device data 1090, sensor data 1091, and/or any other types of data defined above or described with respect to FIGS. 8A-9B.

The different components of the computing system 1040 (and the smart textile-based garment 1000) shown in FIGS. 10A-10C can be coupled via a wired connection (e.g., via busing). Alternatively, one or more of the devices shown in FIGS. 10A-10C may be wirelessly connected (e.g., via short-range communication signals).

Example System for Knitting Smart Textile-Based Garments

Figure 11:
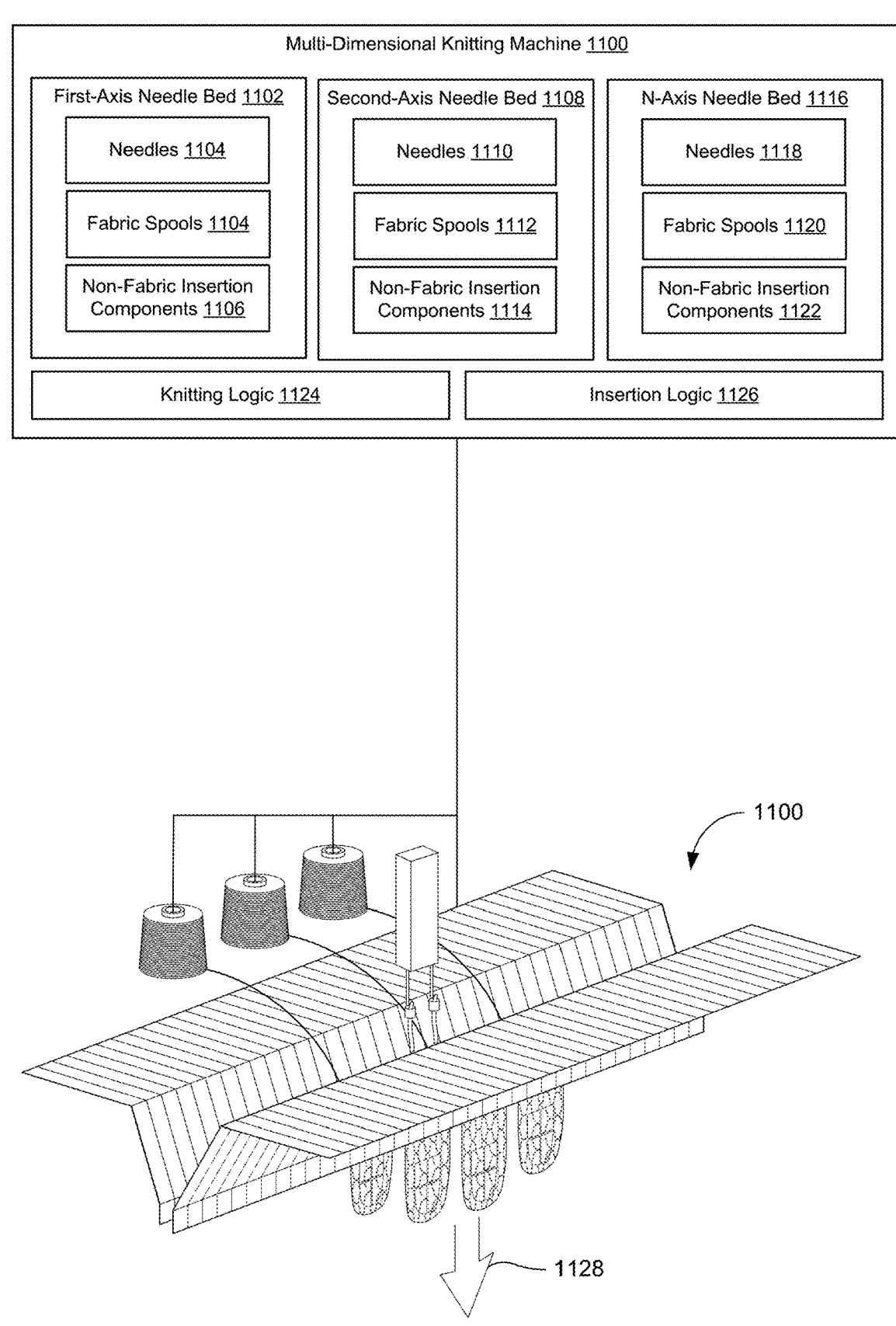
FIG. 11 illustrates a multi-dimensional knitting machine configured to produce multi-dimensional knitted garments in an automated, in accordance with some embodiments.

Attention is now directed to FIG. 11, which illustrates a multi-dimensional knitting machine configured to produce multi-dimensional knitted garments in an automated fashion (e.g., with the needing for any hand knitting or other user intervention after initiating the knitting process, including allowing for having an electronic component automatically knitted as an integrated component of the multi-dimensional knitted garments), in accordance with some embodiments. The multi-dimensional knitting machine 1100 is a garment-producing device that is computer controlled and user programmable to allow for complex knitted structures to be produced (e.g., smart textile-based garments 1000 (FIGS. 10A-10C); such as gloves, tubular fabrics, fabrics with embedded electronic devices, complex knit patterns, special stretch characteristics, unique pattern structures, multi-thread structures, etc.). The multi-dimensional knitting machine 1100 includes a first-axis needle bed 1102, a second-axis needle bed 1108, and N-axis needle bed (indicating more than three needle beds are possible). Each one of these needle beds (e.g., needles 1104, needles 1110, and needles 1118) is configured to use multiple different types of knit patterns (e.g., jersey knits, rib knits, interlock knits, French-terry knits, fleece knits, etc.,) based on a programmed sequence providing to the multi-dimensional knitting machine 1100, and variations of these knits can be employed to form a single continuous garment (e.g., a combination of jersey knits and French terry knit and/or a first variation of a jersey knit and a second variation of a jersey knit). In some embodiments, the variations of these knits in a single continuous garment can be done without producing seams (e.g., a seamless wearable device can be produced). In some embodiments, the knitting machine is further configured to layer fabrics to produce multilayered wearable structures (e.g., to house one or more electronic components). In some embodiments, each layer in a multi-layered wearable structure can be made from a different fabric, which in one example is produced using a conductive yarn. For example, a two-layer knitted capacitive sensor can be produced using the multi-dimensional knitting machine 1100, where the first layer and the second layer use different thread (e.g., a coated-conductive thread and an uncoated-conductive thread). A plurality of fabric spools (e.g., fabric spools 1104, fabric spools 1112, and fabric spools 1120) can be included for each one of the needle beds. Multiple types of fabric spools can be used for each needle bed allowing for even more complex woven structures (also referred to as garments) to be produced. In some embodiments, the fabric spools can also include elastic thread allowing for stretchable fabrics and/or fabrics with shape memory to be produced.

Each of the needle beds discussed above can also include one or more non-fabric insertion components (e.g., non-fabric insertion components 1106, non-fabric insertion components 1114, and non-fabric insertion components 1122) that are configured to be used to allow for insertion of non-fabric structures into the needle beds, such that the non-knitted structure can be knitted into the knitted structure, while the knitted structure (e.g., garment) is being produced. For example, non-fabric structures can include flexible printed circuit boards, rigid circuit boards, conductive wires, structural ribbing, sensors (e.g., neuromuscular signal sensors, light sensors, PPG sensors, etc.), etc. In some embodiments, a stitch pattern can be adjusted by the multi-dimensional knitting machine (e.g., in accordance with a programmed sequence of knit instructions provided to the machine) to accommodate these structures, which, in some embodiments, means that these structures are knitted into the fabric, instead of being sewn on top of a knitted fabric. This allows for garments to be lighter, thinner, and more comfortable to wear (e.g., by having fewer protrusions applying uneven pressure to the wearer's skin). In some embodiments, these multi-dimensional knitting machines can also knit knitted structures along either or both of a vertical axis or a horizontal depending on desired characteristics of the knitted structure. Knitting along a horizontal axis means that the garment would be produced from a left side to a right side (e.g., a glove would be produced starting with the pinky finger, then moving to the ring finger, then middle finger, etc. Sewing on the vertical means that the garment is produced in a top-down fashion (e.g., a glove would be produced starting from the top of the tallest finger and move down to the wrist portion of the glove (e.g., as shown by 1128 in FIG. 11)). With respect to the glove examples, a reverse manufacturing process is also contemplated (e.g., knitting a thumb first when knitting on the horizontal and knitting the wrist portions when knitting on the vertical). In some embodiments, the insertion component can feed the non-knitted structure to the knitting machine or, in some other embodiments, the insertion component is fed through the knitting machine with the non-knitted structure. In the latter, the insertion component is not integrated into the garment and is discarded. In some embodiments, the insertion component is not fed at all, but is an integrated component of the multi-dimensional knitting machine that is activated based on a programming knit sequence to then allow for insertion of a non-knitting component into a knitted structure.

The multi-dimensional knitting machine 1100 also includes knitting logic module 1124, which is a module that is user programmable to allow for a user (which can be a manufacturing entity producing wearable structures on mass scale) to define a knitting sequence to produce a garment using any of the above-described materials, stitch patterns, knitting techniques, etc. As stated above, the knitting logic module 1124 allows for a seamless combination of any of the above-described techniques, thereby allowing unique complex knitted structures to be produced in a single knitting sequence (e.g., the user does not need to remove the knitted structure, then reinsert and reorient it to complete knitting the knitted structure). The multi-dimensional knitting machine 1100 also includes insertion logic module 1126, which works in tandem with the knitting logic module 1124, to allow for insertion of non-fabric components to be seamlessly inserted into the knitted structure while the knitted structure is knitted together. The insertion logic is in communication with the knitting logic to allow for the knit to be adjusted in accordance with where the non-fabric structure is being inserted. In some embodiments, the user need only show where the non-fabric structure is to be inserted in their mock-up (e.g., at a user interface associated with the multi-dimensional knitting machine, which user interface allows for creating and editing a programmed knit sequence) and the knitting logic module 1124 and insertion logic module 1126 automatically work together to allow for the knitted structure to be produced.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A wearable device for providing haptic feedback to a user wearing the wearable device, comprising:
    a unit cell that includes:
        a structural element that has a proximal side and a distal side;
        a first distal haptic-feedback generator of a first kind and a second distal haptic-feedback generator of the first kind that are both connected to the distal side of the structural element; and
        a proximal haptic-feedback generator that is connected to the proximal side of the structural element; and
    a processor configured to:
        cause a first type of haptic feedback by activating the first distal haptic-feedback generator to cant the structural element relative to skin of the user; and
        cause a second type of haptic feedback by activating the first and second distal haptic-feedback generators to displace the structural element; and
        cause a third type of haptic feedback by activating the proximal haptic-feedback generator.

2. The wearable device of claim 1, wherein the processor is configured to:
    cause two of the first type of haptic feedback, the second type of haptic feedback, and the third type of haptic feedback to be provided during a same time.

3. The wearable device of claim 1, wherein:
    the unit cell further includes a third distal haptic-feedback generator of the first kind that is connected to the distal side of the structural element;
    causing the first type of haptic feedback further includes foregoing activating the third distal haptic-feedback generator;

causing the second type of haptic feedback further includes activating the third distal haptic-feedback generator; and
    the processor is further configured to cause a fourth type of haptic feedback, distinct from the first, second, and third types of haptic feedback, by activating the first and third distal haptic-feedback generators to cant the structural element.

4. The wearable device of claim 1, wherein:
    the unit cell is of a first construction,
    the wearable device further includes another unit cell of the first construction; and
    the processor is further configured to cause a fifth type of haptic feedback via the unit cell and the other unit cell.

5. The wearable device of claim 4, wherein:
    the unit cell is in direct communication with the processor and the other unit cell;
    the other unit cell is not in direct communication with the processor; and
    the unit cell is configured to transmit instructions received from the processor to the other unit cell.

6. The wearable device of claim 1, wherein the unit cell further includes a thermal-feedback generator that is connected to the proximal side of the structural element.

7. The wearable device of claim 1, wherein the wearable device further comprises kinesthetic impedance actuators that restrict freedom of movement of a body part of the user.

8. The wearable device of claim 1, wherein:
    the structural element of the unit cell includes a protrusion that extends from the proximal side of the structural element in a direction away from the distal side of the structural element; and
    the proximal haptic-feedback generator is attached to the protrusion such that it is located at a farthest point from the distal side of the structural element.

9. The wearable device of claim 8, wherein:
    the unit cell further includes a third distal haptic-feedback generator of the first kind that is connected to the distal side of the structural element;
    the structural element is triangular and planar, wherein the structural element includes three vertices; and
    each of the first distal haptic-feedback generator, the second distal haptic-feedback generator, and the third distal haptic-feedback generator is connected to a respective vertex of the three vertices of the structural element.

10. The wearable device of claim 1, wherein:
    the wearable device further includes an electroactive polymer (EAP) sensor that is configured to sense stress applied to the EAP sensor and to communicate data regarding the stress applied to the EAP sensor to the processor; and
    the processor is further configured to cause a modification of the first type of haptic feedback, the second type of haptic feedback, or the third type of haptic feedback based on the stress data.

11. The wearable device of claim 1, wherein each of the first and second distal haptic-feedback generators and the proximal haptic-feedback generator includes a respective dielectric elastomer actuator (DEA) that is configured to contract when an electric signal is applied to the DEA.

12. The wearable device of claim 1, wherein the wearable device is in communication with an artificial reality headset, and the first, second, and third types of haptic feedback correspond to an artificial reality displayed at the artificial reality headset.

13. A non-transitory computer-readable storage medium including instructions that, when executed by an electronic device that includes a unit cell that includes: (i) a structural element that has a proximal side and a distal side, (ii) a first distal haptic-feedback generator of a first kind and a second distal haptic-feedback generator of the first kind that are both connected to the distal side of the structural element, and a proximal haptic-feedback generator that is connected to the proximal side of the structural element, cause the electronic device to:

cause a first type of haptic feedback by activating the first distal haptic-feedback generator to cant the structural element relative to skin of a user; and cause a second type of haptic feedback by activating the first and second distal haptic-feedback generators to displace the structural element; and cause a third type of haptic feedback by activating the proximal haptic-feedback generator.

14. The non-transitory computer-readable storage medium of claim 13, wherein the instructions that, when executed by an electronic device, further cause the electronic device to:

cause two of the first type of haptic feedback, the second type of haptic feedback, and the third type of haptic feedback to be provided during a same time.

15. The non-transitory computer-readable storage medium of claim 13, wherein the unit cell further includes a third distal haptic-feedback generator of the first kind that is connected to the distal side of the structural element;

causing the first type of haptic feedback further includes foregoing activating the third distal haptic-feedback generator;

causing the second type of haptic feedback further includes activating the third distal haptic-feedback generator; and the instructions that, when executed by an electronic device, further cause the electronic device to, cause a fourth type of haptic feedback, distinct from the first, second, and third types of haptic feedback, by activating the first and third distal haptic-feedback generators to cant the structural element.

16. The non-transitory computer-readable storage medium of claim 13, wherein:

the unit cell is of a first construction, the wearable device further includes another unit cell of the first construction; and the instructions that, when executed by an electronic device, further cause the electronic device to cause a fifth type of haptic feedback via the unit cell and the other unit cell.

17. A method of providing haptic feedback to a user wearing a wearable device, the method including:

at a unit cell that includes: (i) a structural element that has a proximal side and a distal side, (ii) a first distal haptic-feedback generator of a first kind and a second distal haptic-feedback generator of the first kind that are both connected to the distal side of the structural element, and a proximal haptic-feedback generator that is connected to the proximal side of the structural element:

causing, via processor, a first type of haptic feedback by activating the first distal haptic-feedback generator to cant the structural element relative to skin of the user; and causing, via processor, a second type of haptic feedback by activating the first and second distal haptic-feedback generators to displace the structural element; and causing, via processor, a third type of haptic feedback by activating the proximal haptic-feedback generator.

18. The method of claim 17, comprising:

causing two of the first type of haptic feedback, the second type of haptic feedback, and the third type of haptic feedback to be provided during a same time.

19. The method of claim 17, wherein the unit cell further includes a third distal haptic-feedback generator of the first kind that is connected to the distal side of the structural element;

causing the first type of haptic feedback further includes foregoing activating the third distal haptic-feedback generator;

causing the second type of haptic feedback further includes activating the third distal haptic-feedback generator; and the method further comprising, causing a fourth type of haptic feedback, distinct from the first, second, and third types of haptic feedback, by activating the first and third distal haptic-feedback generators to cant the structural element.

20. The method of claim 17, wherein:

the unit cell is of a first construction, the wearable device further includes another unit cell of the first construction; and the method further comprising, causing the wearable device to cause a fifth type of haptic feedback via the unit cell and the other unit cell.

* * * * *